(12) United States Patent
Moore

(10) Patent No.: US 7,277,102 B2
(45) Date of Patent: Oct. 2, 2007

(54) RENDERING GRAPHIC OBJECT BASED IMAGES

(75) Inventor: Kevin John Moore, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 09/836,226

(22) Filed: Apr. 18, 2001

(65) Prior Publication Data

US 2002/0015039 A1    Feb. 7, 2002

(30) Foreign Application Priority Data

Apr. 18, 2000 (AU) ..................................... PQ6971

(51) Int. Cl.
*G09G 5/00* (2006.01)
(52) U.S. Cl. ...................... 345/629; 345/619; 345/620; 345/631; 345/581
(58) Field of Classification Search ................... 717/2; 345/619–641, 642
See application file for complete search history.

(56) References Cited

U.S. PATENT DOCUMENTS

| | | | | |
|---|---|---|---|---|
| 5,454,071 A | | 9/1995 | Siverbrook et al. | 395/141 |
| 5,471,568 A | * | 11/1995 | Webb et al. | 382/199 |
| 5,600,763 A | | 2/1997 | Greene et al. | 395/120 |
| 5,745,121 A | * | 4/1998 | Politis | 345/619 |
| 5,970,496 A | * | 10/1999 | Katzenberger | 707/102 |
| 6,330,003 B1 | * | 12/2001 | Curtis et al. | 345/648 |

FOREIGN PATENT DOCUMENTS

AU     A-38233/93     11/1993

AU     9947508 A   *   3/2000

OTHER PUBLICATIONS http://www2.toki.or.id/book/AlgDesignManual/BOOK/BOOK4/NODE159.HTM.*
http://www.nist.gov/dads/HTML/directAcycGraph.html☐☐http://www.nist.gov/dads/HTML/directgraph.html☐☐http://www.nist.gov/dads/HTML/tree.html.*
"Compositing Digital images", Thomas Porter et al., Computer Graphics, vol. 18, No. 3, Jul. 1984, pp. 253-259.

* cited by examiner

*Primary Examiner*—Ulka Chauhan
*Assistant Examiner*—Eric Woods
(74) *Attorney, Agent, or Firm*—Fitzpatrick, Cella, Harper & Scinto

(57) ABSTRACT

Disclosed are methods, apparatus (1) and computer readable media for rendering at least one graphic object (80, 90) described by at least one edge (82-86, 92-98) into a raster pixel image (78) having a plurality of scan lines and a plurality of pixel locations on each scan line. For each scan line, coordinates of intersection of those edges of the objects that intersect the scan line are determined in a predetermined order. This is preferably achieved by processing edge records (418) using a number of buffers (402, 404,406, 412,420, 422) thereby enabling efficient sorting of edge intersections into order. For each adjacent pair of edge intersections, information (530) associated with the corresponding object is examined to determining a set of active objects (508, 510) for a span of pixel locations between the corresponding pair of edge intersections. For each span of pixel locations, the corresponding set of active objects is used to determine (600) a value for each of the locations within the span. The information may include one or more of a fill count, a clip count and other factors. A compositing model accommodating opacity is also disclosed, as are stack operations used to facilitate rendering and other features which contribute to fast processing of image components.

15 Claims, 30 Drawing Sheets

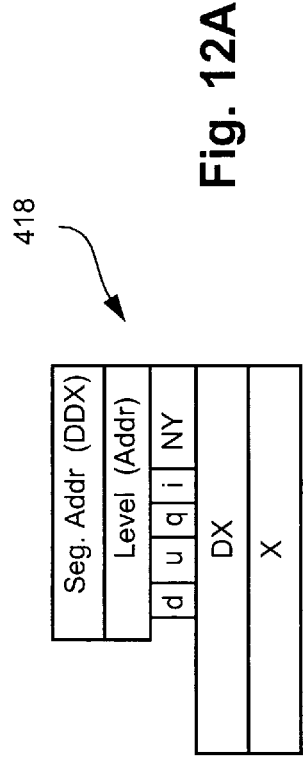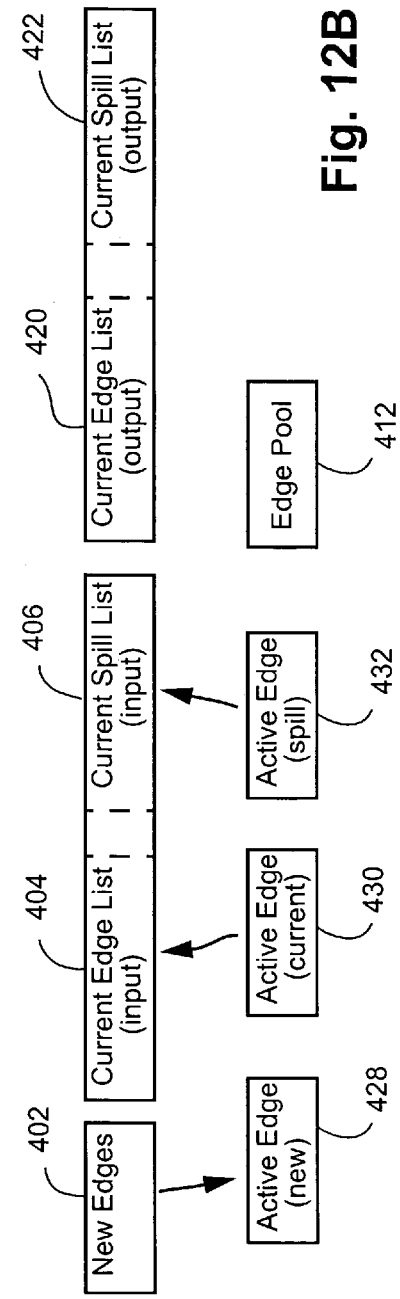

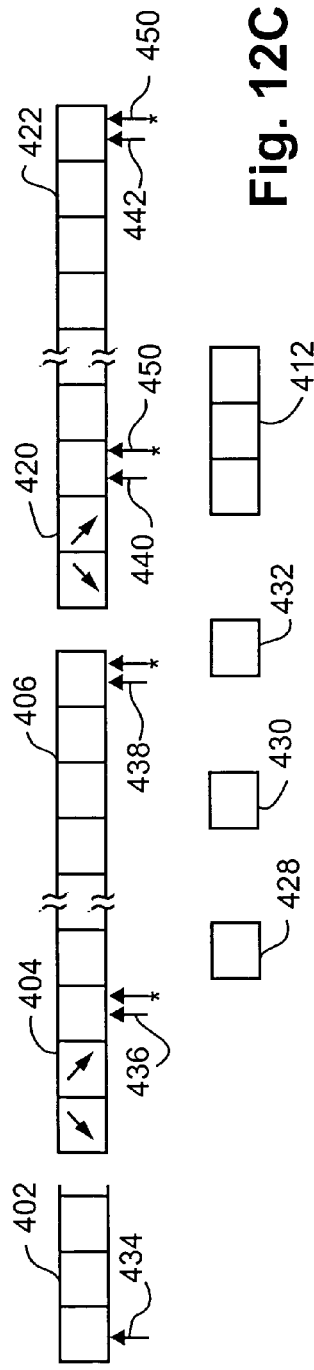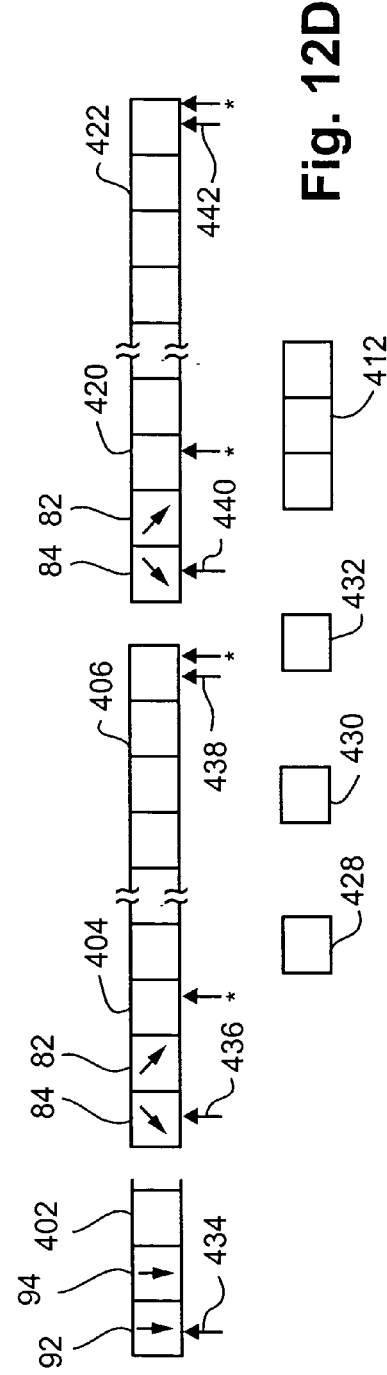

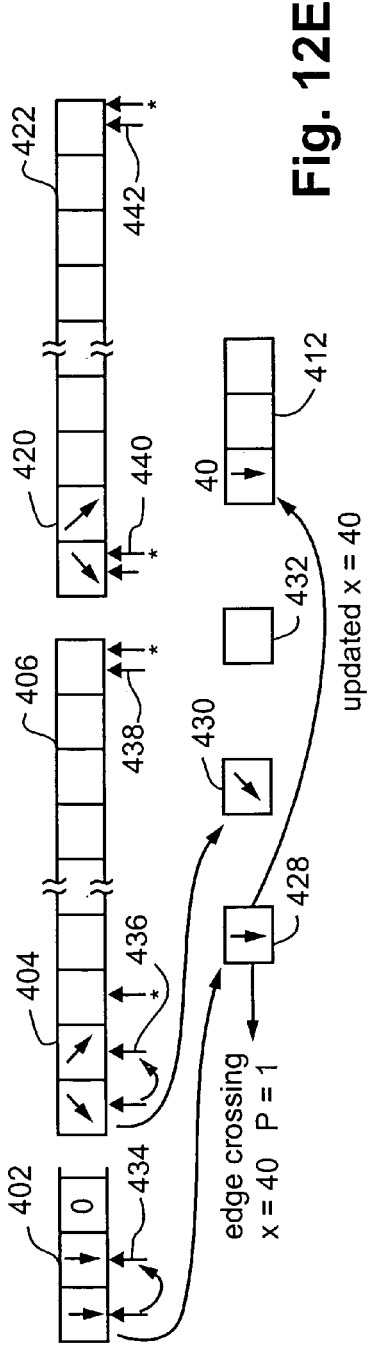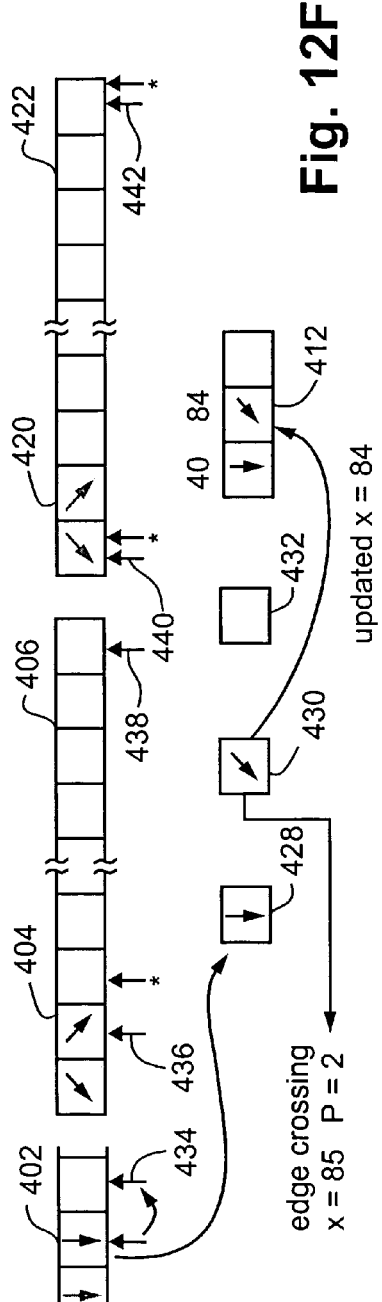

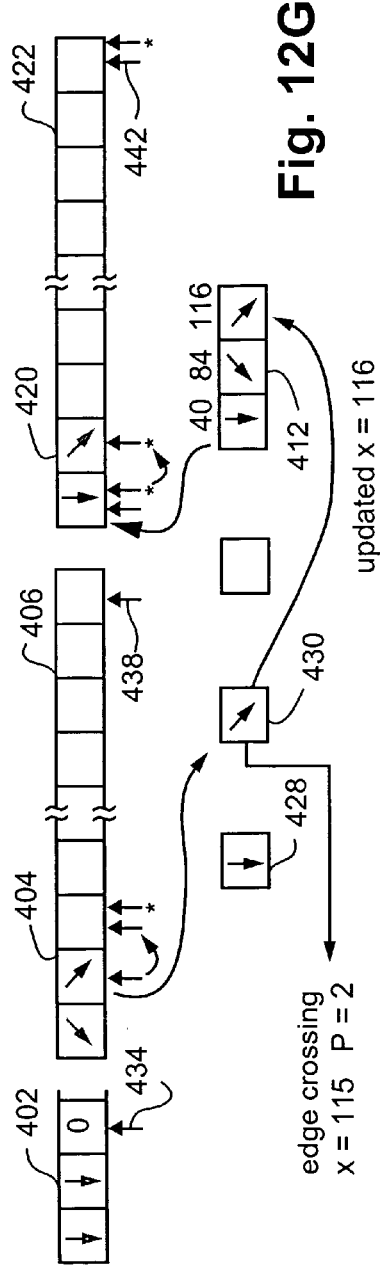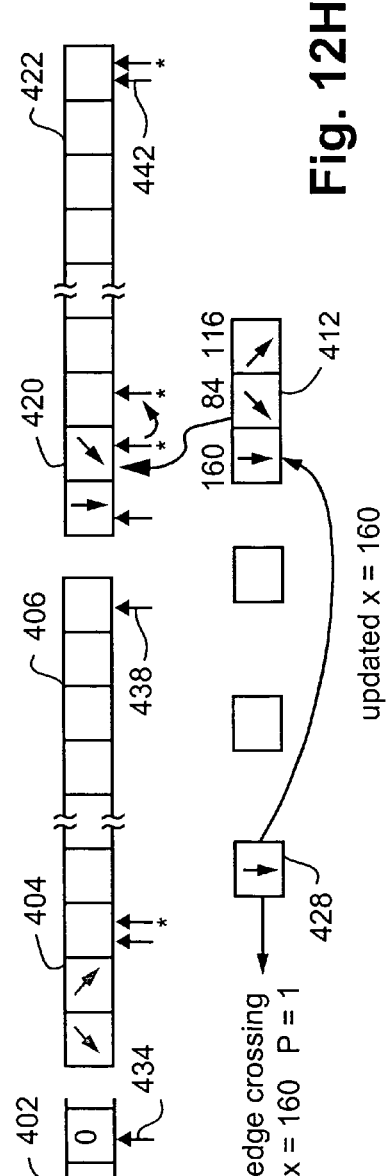

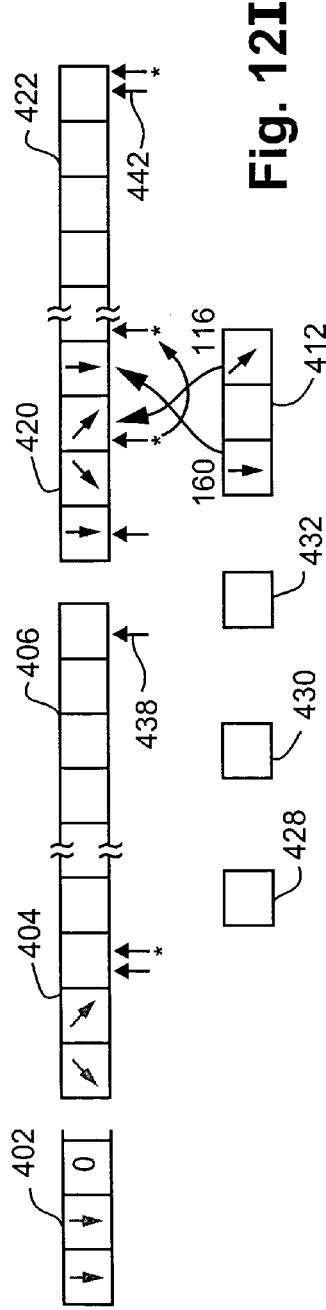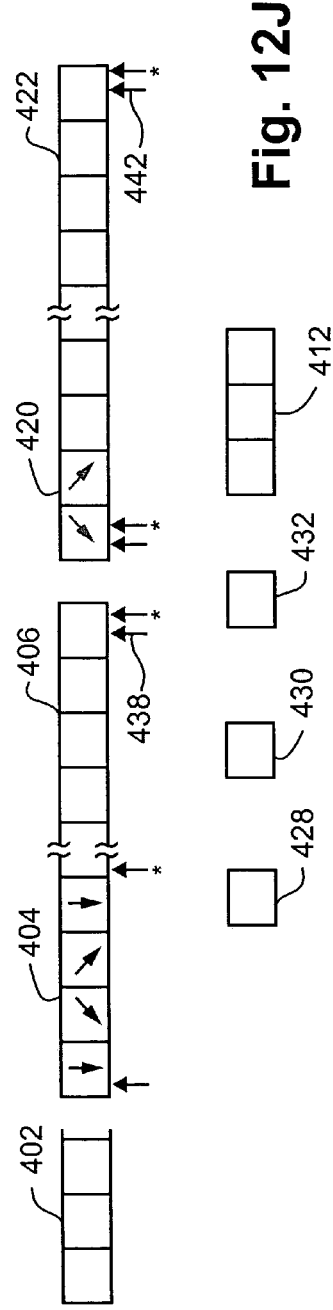

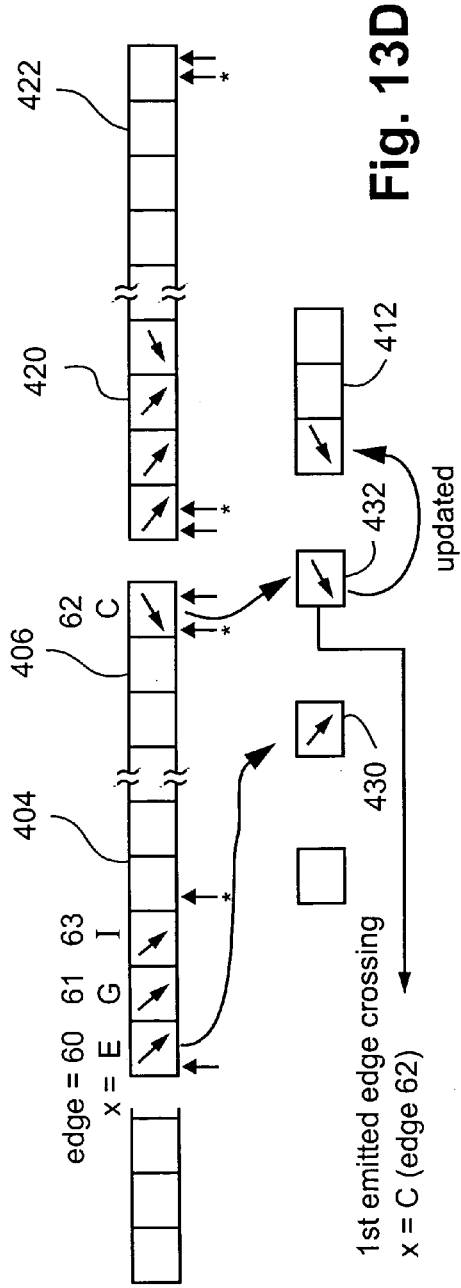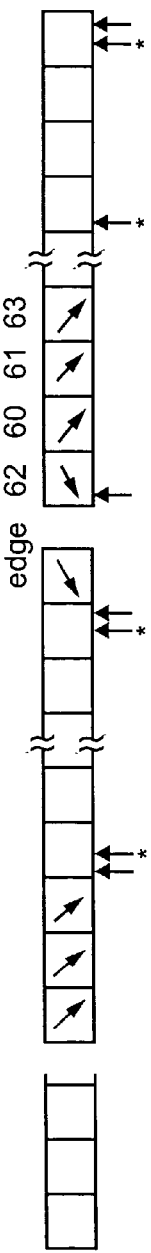
Fig. 13D
Fig. 13E

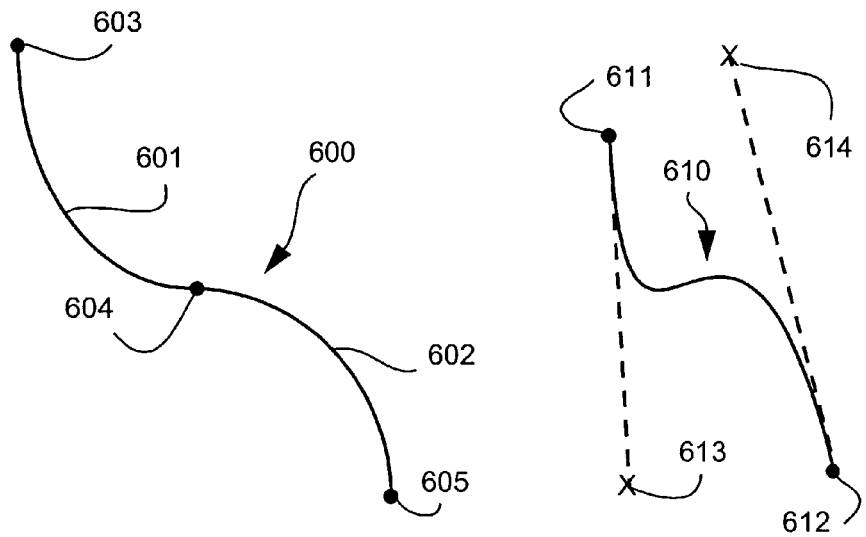
Fig. 14A (Prior Art)
Fig. 14B (Prior Art)
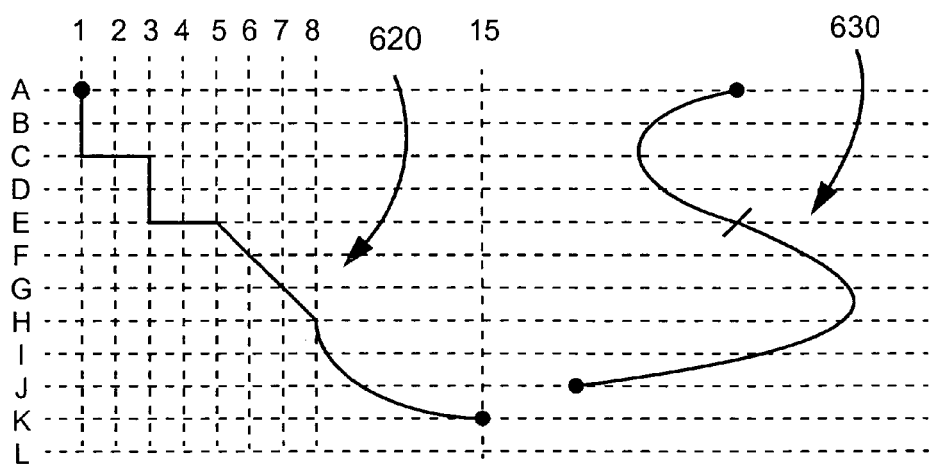
Fig. 14C
Fig. 14D

| Edge 84 | Edge 92 |
|---|---|
| X = 100 | X = 40 |
| NY = 70 | NY = 70 |
| DX = 1 | DX = 0 |
| DDX = 0 | DDX = 0 |
| P = 1 | P = 0 |
| DIR = (-) | DIR = (+) |
| ADD = (irrelevant in this example) | ADD = (irrelevant in this example) |

| Raster operation code | Operation | Comment |
|---|---|---|
| 0x00 | r = 0 | BLACKNESS |
| 0x01 | r = src & dest | SRCAND |
| 0x02 | r = src & ~dest | SRCERASE |
| 0x03 | r = src | SRCCOPY |
| 0x04 | r = ~src & dest | |
| 0x05 | r = dest | NOP |
| 0x06 | r = src ^ dest | SRCINVERT |
| 0x07 | r = src \| dest | SRCPAINT |
| 0x08 | r = ~(src \| dest) | NOTSRCERASE |
| 0x09 | r = ~(src ^ dest) | |
| 0x0a | r = ~dest | DSTINVERT |
| 0x0b | r = src \| ~dest | |
| 0x0c | r = ~src | NOTSRCCOPY |
| 0x0d | r = ~src \| dest | MERGEPAINT |
| 0x0e | r = ~(src & dest) | |
| 0x0f | r = 0xff | WHITENESS |
| 0x10 | r = min(src, dest) | |
| 0x11 | r = max(src, dest) | |
| 0x12 | r = clamp(src + dest) | |
| 0x13 | r = src | |
| 0x14 | r = clamp(src - dest) | |
| 0x15 | r = dest | |
| 0x16 | r = clamp(dest - src) | |
| 0x17 | r = clamp(src + dest) where dest is signed | |
| 0x18 | r = threshold (dest, src) | |
| 0x19 | r = threshold (src, dest) | |
| 0x1a | r = ~ dest | |
| 0x1b | o = luminance (dest, src) | |
| 0x1c | r = ~src | |
| 0x1d | o = ckey(dest; src +/- o) | |

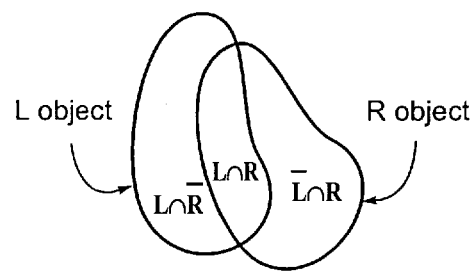
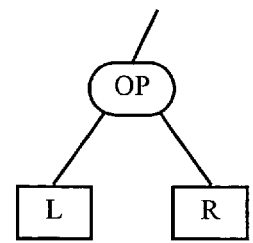
Fig. 18A                Fig. 18B
Fig. 19
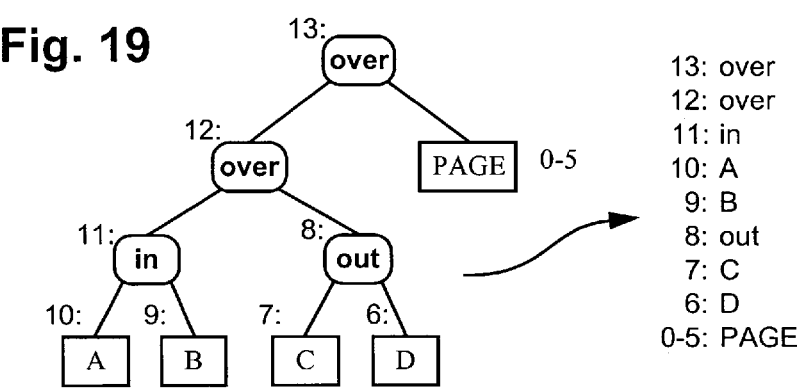
13: over
12: over
11: in
10: A
9: B
8: out
7: C
6: D
0-5: PAGE
Fig. 20
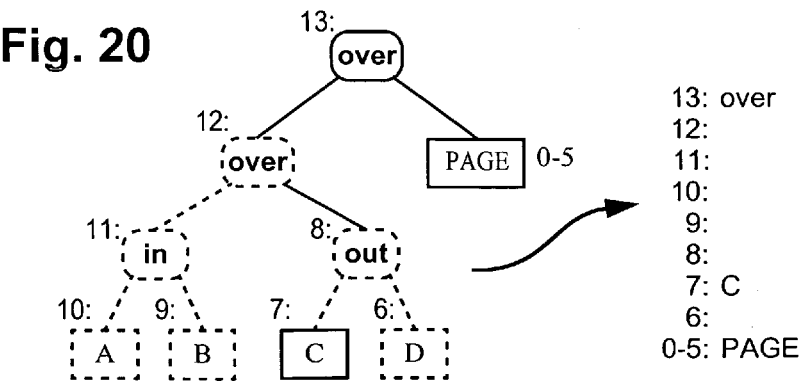
13: over
12:
11:
10:
9:
8:
7: C
6:
0-5: PAGE

| Index | L Active | R Active | L∩R reqd | L∩R̄ reqd | Leaf/ Operator Entry | Node Active | Parent | Node is L | Generate L | Generate R | L∩R op used | R Branch Index |
|---|---|---|---|---|---|---|---|---|---|---|---|---|
| 13 | 0 | 1 | 1 | 1 | over | 1 | ? | 0 | 0 | 1 | 0 | 5 |
| 12 | 0 | 0 | 1 | 1 | over | 0 | 13 | 1 | 0 | 0 | 0 | 8 |
| 11 | 0 | 0 | 0 | 0 | in | 0 | 12 | 1 | 0 | 0 | 0 | 9 |
| 10 | | | | | leaf A | 0 | 11 | 1 | | | | |
| 9 | 0 | 0 | 1 | 0 | leaf B | 0 | 11 | 0 | 0 | 0 | 0 | 6 |
| 8 | | | | | out | 0 | 12 | 0 | | | | |
| 7 | | | | | leaf C | 0 | 8 | 1 | | | | |
| 6 | | | | | leaf D | 0 | 8 | 0 | | | | |

PAGE

Fig. 21

| Index | L Active | R Active | L∩R̄ reqd | L̄∩R reqd | Leaf/Operator Entry | Node Active | Parent | Node is L | Generate L | Generate R | L∩R op used | R Branch Index |
|---|---|---|---|---|---|---|---|---|---|---|---|---|
| 13 | 1 | 1 | 1 | 1 | over | 1 | ? | 0 | 1 | 1 | 1 | 5 |
| 12 | 0 | 1 | 1 | 1 | over | 1 | 13 | 1 | 0 | 1 | 0 | 8 |
| 11 | 0 | 0 | 0 | 0 | in | 0 | 12 | 1 | 0 | 0 | 0 | 9 |
| 10 | | | | | leaf A | 0 | 11 | 1 | | | | |
| 9 | | | | | leaf B | 0 | 11 | 0 | | | | |
| 8 | 1 | 0 | 1 | 0 | out | 1 | 12 | 0 | 1 | 0 | 0 | 6 |
| 7 | | | | | leaf C | 1 | 8 | 1 | | | | |
| 6 | | | | | leaf R | 0 | 8 | 0 | | | | |
| | | | | | PAGE | | | | | | | |

Fig. 23

| Index | L Active | R Active | L∩R̄ reqd | L̄∩R reqd | L obscures R | R obscures L | Leaf/ Operator Entry | Node Active | Parent | Node is L | Generate L | Generate R | L∩R op used | R Branch Index |
|---|---|---|---|---|---|---|---|---|---|---|---|---|---|---|
| | | | 0 | 0 | 0 | 0 | in | | | | | | | |
| | | | 0 | 0 | 1 | 0 | (CLIP IN) | | | | | | | |
| | | | 1 | 0 | 0 | 0 | out | | | | | | | |
| | | | 1 | 0 | 1 | 1 | (CLIP OUT) | | | | | | | |

Fig. 25

| L | T | T | T | L | L | L | O | O | O |
|---|---|---|---|---|---|---|---|---|---|
| R | T | R | O | T | R | O | T | R | O |
| Generate L | 0 | 0 | 0 | 0 | 1 | 1 | 0 | 1 | 1 |
| Generate R | 0 | 0 | 0 | 0 | 0 | 0 | 0 | 0 | 0 |
| Result | T | T | T | T | L | L | T | O | O |

Fig. 26

| L | T | T | T | L | L | L | O | O | O |
|---|---|---|---|---|---|---|---|---|---|
| R | T | R | O | T | R | O | T | R | O |
| Generate L | 0 | 0 | 0 | 0 | 1 | 1 | 0 | 1 | 1 |
| Generate R | 0 | 0 | 0 | 0 | 1 | 1 | 0 | 1 | 1 |
| Result | T | T | T | T | LR | L | T | R | O |

Fig. 27

| L | T | T | T | L | L | L | O | O | O |
|---|---|---|---|---|---|---|---|---|---|
| R | T | R | O | T | R | O | T | R | O |
| Generate L | 0 | 0 | 0 | 1 | 1 | 1 | 1 | 1 | 1 |
| Generate R | 0 | 0 | 0 | 0 | 1 | 1 | 0 | 1 | 1 |
| Result | T | T | T | L | L(1-R) | T | O | (1-R) | T |

Fig. 28

| L | T | T | T | L | L | L | O | O | O |
|---|---|---|---|---|---|---|---|---|---|
| R | T | R | O | T | R | O | T | R | O |
| Generate L | 0 | 0 | 0 | 1 | 0 | 0 | 1 | 0 | 0 |
| Generate R | 0 | 0 | 0 | 0 | 0 | 0 | 0 | 0 | 0 |
| Result | T | T | T | L | T | T | O | T | T |

Fig. 29

RENDERING GRAPHIC OBJECT BASED IMAGES

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to rendering graphic object based images. In particular, the present invention relates to a method and apparatus for generating instructions for an expression tree. The invention also relates to a method and apparatus for rendering an expression tree into a raster pixel image. The invention also relates to a computer readable medium comprising a computer program for implementing any of the aforesaid methods.

BACKGROUND

Most object based graphics systems utilise a frame store or page buffer to hold a pixel-based image of the page or screen. Typically, the outlines of the graphic objects are calculated, filled and written into the frame store. For two-dimensional graphics, objects which appear in front of other objects are simply written into the frame store after the background objects, thereby replacing the background on a pixel-by-pixel basis. This is commonly known in the art as the "Painter's algorithm". Objects are considered in priority order, from the rearmost object to the foremost object, and, typically, each object is rasterised in scan line order and pixels are written to the frame store in sequential runs along each scan line.

There are essentially two problems with this technique. The first is that it requires fast random access to all the pixels in the frame store. This is because each new object considered could affect any pixel in the frame-store. For this reason, the frame store is normally kept in semiconductor random access memory (RAM). For high resolution colour printers the amount of RAM required is very large, typically in excess of 100 MBytes, which is costly and difficult to operate at high speed. The second problem is that many pixels, which are painted (rendered), are over-painted (re-rendered) by later objects. Painting the pixels with the earlier objects was a waste of time.

One method for overcoming the large frame-store problem is the use of "banding". When banding is used, only part of the frame-store exists in memory at any one time. All of the objects to be drawn are retained in a "display list". The whole image is rendered as above, but pixel painting (rendering) operations that try to paint (render) outside the fraction of the frame-store which exists are "clipped" out. After all the objects have been drawn, the fractional part of the frame-store is sent to the printer (or some other location) and another fraction of the frame-store is selected and the process repeated. There are penalties with this technique. For example, the objects being drawn must be considered and re-considered many times—once for each band. As the number of bands increases, so too does the repetitious examination of objects requiring rendering. The technique of banding does not solve the problem of the cost of over-painting.

Some other graphic systems consider the image in scan line order. Again, all the objects to be drawn are retained in a display list. On each scan line the objects which intersect that scan line are then considered in priority order and for each object, spans of pixels between object edge intersection points are set in a line store. This technique also overcomes the large frame store problem, but still suffers from the over-paint problem.

There are other techniques, which overcome both the large frame-store problem and the over-painting problem. In one such technique, each scan line is produced in turn. Again, all the objects to be drawn are retained in a display list. On each scan line, the edges of objects which intersect that scan line are held in order of increasing coordinate of intersection with the scan line. These points of intersection, or edge crossings, are considered in turn and used to toggle an array of active fields. There is one active field for each object priority that is of interest on the scan line. Between each pair of edges considered, the colour data for each pixel which lies between the first edge and the next edge is generated by using a priority encoder on the active flags to determine which priority is topmost, and using the colour associated with that priority for the pixels of the span between the two edges. In preparation for the next scan line, the coordinate of intersection of each edge is updated in accordance with the nature of each edge. Adjacent edges, which become mis-sorted as a result of this update are swapped. New edges are also merged into the list of edges.

This technique has the significant advantages that there is no frame store or line store, there is no over painting, and the object priorities are dealt with in constant order time, rather than order N time (where N is the number of priorities).

However, these priority encoders lack sufficient flexibility to cope with a tree based graphical expression. In particular, those expressions which include OUT and ATOP Porter and Duff compositing operators as described in "Compositing Digital Images", Porter, T; Duff, T; Computer Graphics, Vol. 18 No. 3 (1984) pp. 253-259. The problems arise because the compositing operation depends on which of the graphic objects composited by the operation are active at a given pixel location. One solution to this problem is to use a complex arrangement of clipping objects, which requires a lot of extra edge processing and requires a large number of levels for the clipping objects.

SUMMARY OF THE INVENTION

It is an object of the present invention to substantially overcome, or at least ameliorate, one or more disadvantages of existing arrangements.

According to a first aspect of the invention, there is provided a method of generating instructions for a directed acyclic graph. The directed acyclic graph comprises one or more parent nodes and one or more leaf nodes, each parent node representing an operator and having branches to respective descendent nodes, and each leaf node representing a graphic object having object edges. The method includes determining groups of one or more pixel locations, where the groups are bounded by object edges, determining, for each group, a portion of the directed acyclic graph in accordance with activities of the operators, where the portion of the directed acyclic graph is that portion which passes data up the directed acyclic graph. The method also includes generating, for each group, instructions for the determined portion of the directed acyclic graph, where operator instructions are generated for those operators of the determined portion of the directed acyclic graph having active branches and where leaf instructions are generated for those graphic objects which are active at the group of one or more pixel locations.

According to a second aspect of the invention, there is provided a method of generating instructions for an expression tree. The expression tree has a plurality of nodes comprising one or more binary nodes and a plurality of leaf nodes, where each binary node has a left branch to a descendent node and a right branch to another descendent node and represents a binary operation on the two descendant nodes, and where each node represents a graphic object having object edges, with one or more graphic objects overlapping. The overlapping graphics objects comprise a left node region, a common region, and a right node region. The method includes determining groups of one or more pixel locations, where the groups are bounded by object edges, and determining, for each group, whether the left and right branches of the one or more binary nodes are active or inactive. The method also includes traversing, for each group, the expression tree, where the left branch of any previously traversed binary node is ignored unless the right and left branches of the previously traversed binary node are active or a left node region is required for the binary operation of the previously traversed binary node and the left branch is active and the right branch is inactive of the previously traversed binary node, and where a right branch of any previously traversed binary node is ignored unless the right and left branches of the previously traversed binary node are active or a right node region is required for the binary operation of the previously traversed binary node and the right branch is active and the left branch is inactive of the previously traversed binary node. The method also includes generating, for each group, operator instructions for any traversed binary node having active right and left branches, and leaf value instructions for any traversed leaf node.

According to a third aspect of the invention, there is provided a method of rendering an expression tree into a raster pixel image having a plurality of scanlines and a plurality of pixel locations on each scanline. The expression tree has a plurality of nodes comprising one or more binary nodes and a plurality of leaf nodes, where each binary node has a left branch to a descendent node and a right branch to another descendent node and represents a binary operation on the two descendant nodes, and where each node represents a graphic object having object edges, with one or more graphic objects overlapping. The overlapping graphics objects comprise a left node region, a common region, and a right node region. The method includes generating a table representative of the expression tree, where the table comprises a plurality of records corresponding to associated binary nodes and leaf nodes, and each record of an associated binary node comprises a first field indicating whether a left region is required for operation of the operator of the associated binary node, a second field indicating whether a right region is required for operation of the operator of the associated binary node, a third field capable of indicating whether a left branch of the associated binary node is active, and a fourth field capable of indicating whether a right branch of the associated binary node is active. The method further includes determining groups of one or more pixel locations, where the groups are bounded by the object edges, determining, for each group, whether the left and right branches of the one or more binary nodes are active or inactive, and updating, for each group, the third and fourth fields of the table for the determined active and inactive branches. The method also includes traversing, for each group, the expression tree in accordance with the updated table where the left branch of any previously traversed binary node is ignored unless the right and left branches of the previously traversed binary node are active or a left node region is required for the binary operation of the previously traversed binary node and the left branch is active and the right branch is inactive of the previously traversed binary node, and where a right branch of any previously traversed binary node is ignored unless the right and left branches of the previously traversed binary node are active or if a right node region is required for the binary operation of the previously traversed binary node and the right branch is active and the left branch is inactive of the previously traversed binary node. The method further includes generating, for each group, operator instructions for any traversed binary node having active right and left branches, and leaf value instructions for any traversed leaf node, and executing, for each group, corresponding generated instructions so as to render the image.

According to a fourth aspect of the invention, there is provided an apparatus for generating instructions for a directed acyclic graph. The directed acyclic graph comprises one or more parent nodes and one or more leaf nodes, each parent node representing an operator and having branches to respective descendent nodes, and each leaf node representing a graphic object having object edges. The apparatus includes means for determining groups of one or more pixel locations, where the groups are bounded by object edges, means for determining, for each group, a portion of the directed acyclic graph in accordance with activities of the operators, where the portion of the directed acyclic graph is that portion which passes data up the directed acyclic graph, and means for generating, for each group, instructions for the determined portion of the directed acyclic graph, where operator instructions are generated for those operators of the determined portion of the directed acyclic graph having active branches and where leaf instructions are generated for those graphic objects which are active the group of one or more pixel locations.

According to a fifth aspect of the invention, there is provided an apparatus for generating instructions for an expression tree. The expression tree has a plurality of nodes comprising one or more binary nodes and a plurality of leaf nodes, where each binary node has a left branch to a descendent node and a right branch to another descendent node and represents a binary operation on the two descendant nodes, and where each node represents a graphic object having object edges, with one or more graphic objects overlapping. The overlapping graphics objects comprise a left node region, a common region, and a right node region. The apparatus includes means for determining groups of one or more pixel locations, where the groups are bounded by object edges, and means for determining, for each group, whether the left and right branches of one or more binary nodes are active or inactive. The apparatus also includes means for traversing, for each group, the expression tree, where the left branch of any previously traversed binary node is ignored unless the right and left branches of the previously traversed binary node are active or a left node region is required for the binary operation of the previously traversed binary node and the left branch is active and the right branch is inactive of the previously traversed binary node, and where a right branch of any previously traversed binary node is ignored unless the right and left branches of the previously traversed binary node are active or a right node region is required for the binary operation of the previously traversed binary node and the right branch is active and the left branch is inactive of the previously traversed binary node, and means for generating, for each group, operator instructions for any traversed binary node having active right and left branches, and leaf value instructions for any traversed leaf node.

According to a sixth aspect of the invention, there is provided an apparatus for rendering an expression tree into a raster pixel image having a plurality of scanlines and a plurality of pixel locations on each scanline. The expression tree has a plurality of nodes comprising one or more binary nodes and a plurality of leaf nodes, where each binary node has a left branch to a descendent node and a right branch to another descendent node and represents a binary operation on the two descendant nodes, and where each node represents a graphic object having object edges, with one or more graphic objects overlapping. The overlapping graphics objects comprise a left node region, a common region, and a right node region. The apparatus includes means for generating a table representative of the expression tree, where the table comprises a plurality of records corresponding to associated binary nodes and leaf nodes, and each record of an associated binary node comprises a first field indicating whether a left region is required for operation of the operator of the associated binary node, a second field indicating whether a right region is required for operation of the operator of the associated binary node, a third field capable of indicating whether a left branch of the associated binary node is active, and a fourth field capable of indicating whether a right branch of the associated binary node is active. The apparatus also includes means for determining groups of one or more pixel locations, where the groups are bounded by the object edges, means for determining, for each group, whether the left and right branches of the one or more binary nodes are active or inactive, and means for updating, for each group, the third and fourth fields of the table for the determined active and inactive branches. The apparatus further includes means for traversing, for each group, the expression tree in accordance with the updated table where the left branch of any previously traversed binary node is ignored unless the right and left branches of the previously traversed binary node are active or a left node region is required for the binary operation of the previously traversed binary node and the left branch is active and the right branch is inactive of the previously traversed binary node, and where a right branch of any previously traversed binary node is ignored unless the right and left branches of the previously traversed binary node are active or a right node region is required for the binary operation of the previously traversed binary node and the right branch is active and the left branch is inactive of the previously traversed binary node. The apparatus further includes means for generating, for each group, operator instructions for any traversed binary node having active right and left branches, and leaf value instructions for any traversed leaf node, and means for executing, for each group, corresponding generated instructions so as to render the image.

According to a seventh aspect of the invention, there is provided a computer readable medium comprising a computer program for generating instructions for a directed acyclic graph. The directed acyclic graph comprises one or more parent nodes and one or more leaf nodes, each parent node representing an operator and having branches to respective descendent nodes, and each leaf node representing a graphic object having object edges. The computer program includes code for determining groups of one or more pixel locations, where the groups are bounded by the object edges, code for determining, for each group, a portion of the directed acyclic graph in accordance with activities of the operators, where the portion of the directed acyclic graph is that portion which passes data up the directed adjacency graph, and code for generating, for each group, instructions for the determined portion of the directed acyclic graph, where operator instructions are generated for those operators of the determined portion of the directed acyclic graph having active branches and where leaf instructions are generated for those graphic objects which are active at the group of one or more pixel locations.

According to an eighth aspect of the invention, there is provided a computer readable medium comprising a computer program for generating instructions for an expression tree. The expression tree has a plurality of nodes comprising one or more binary nodes and a plurality of leaf nodes, where each binary node has a left branch to a descendent node and a right branch to another descendent node and represents a binary operation on the two descendant nodes, and where each node represents a graphic object having object edges, with one or more graphic objects overlapping. The overlapping graphics objects comprise a left node region, a common region, and a right node region. The computer program includes code for determining groups of one or more pixel locations, where the groups are bounded by the object edges, and code for determining, for each group, whether the left and right branches of one or more binary nodes are active or inactive. The computer program includes code for traversing, for each group, the expression tree, where the left branch of any previously traversed binary node is ignored unless the right and left branches of the previously traversed binary node are active or a left node region is required for the binary operation of the previously traversed binary node and the left branch is active and the right branch is inactive of the previously traversed binary node, and where a right branch of any previously traversed binary node is ignored unless the right and left branches of the previously traversed binary node are active or a right node region is required for the binary operation of the previously traversed binary node and the right branch is active and the left branch is inactive of the previously traversed binary node, and code for generating, for each group, operator instructions for any traversed binary node having active right and left branches, and leaf value instructions for any traversed leaf node.

According to a ninth aspect of the invention, there is provided a computer readable medium comprising a computer program for rendering an expression tree into a raster pixel image having a plurality of scanlines and a plurality of pixel locations on each scanline. The expression tree has a plurality of nodes comprising one or more binary nodes and a plurality of leaf nodes, where each binary node has a left branch to a descendent node and a right branch to another descendent node and represents a binary operation on the two descendant nodes, and where each node represents a graphic object having object edges, with one or more graphic objects overlapping. The overlapping graphics objects comprise a left node region, a common region, and a right node region. The computer program includes code for generating a table representative of the expression tree, where the table comprises a plurality of records corresponding to associated binary nodes and leaf nodes, and each record of an associated binary node comprises a first field indicating whether a left region is required for operation of the operator of the associated binary node, a second field indicating whether a right region is required for operation of the operator of the associated binary node, a third field capable of indicating whether a left branch of the associated binary node is active, and a fourth field capable of indicating whether a right branch of the associated binary node is active. The computer program further includes code for determining groups of one or more pixel locations, where the groups are bounded by the object edges, code for determining, for each group, whether the left and right branches of the one or more binary nodes are active or inactive, and code for updating, for each group, the third and fourth fields of the table for the determined active and inactive branches. The computer program also includes code for traversing, for each group, the expression tree in accordance with the updated table wherein the left branch of any previously traversed binary node is ignored unless the right and left branches of the previously traversed binary node are active or a left node region is required for the binary operation of the previously traversed binary node and the left branch is active and the right branch is inactive of the previously traversed binary node, and where a right branch of any previously traversed binary node is ignored unless the right and left branches of the previously traversed binary node are active or a right node region is required for the binary operation of the previously traversed binary node and the right branch is active and the left branch is inactive of the previously traversed binary node, code for generating, for each group, operator instructions for any traversed binary node having active right and left branches, and leaf value instructions for any traversed leaf node, and code for executing, for each group, corresponding generated instructions so as to render the image.

BRIEF DESCRIPTION OF THE DRAWINGS

A preferred embodiment of the present invention will now be described with reference to the accompanying drawings in which:

FIGS. 12A to 12J illustrate the edge update routine implemented by the arrangement of FIG. 4 for the example of FIG. 10;

FIGS. 13A to 13E illustrate how large changes in X coordinates contribute to spill conditions and how they are handled;

FIGS. 14A to 14D provide a comparison between two prior art edge description formats and that used in the preferred embodiment;

FIG. 16 shows an exemplary table of edge records for storage in the edge record store of FIG. 2;

FIG. 17 shows a table of some of the raster operations for use in the preferred embodiment;

FIGS. 18A and 18B show a simple compositing expression illustrated as an expression tree and a corresponding description;

FIG. 19 shows an exemplary expression tree for implementing a series of Porter and Duff compositing operations on objects A,B,C and D and a corresponding instruction list;

FIG. 20 shows the expression tree of FIG. 19 where object C is active and a corresponding instruction list;

FIG. 21 shows a level activation table generated by the level activation table generator of FIG. 5 for the expression tree of FIG. 20;

FIG. 23 shows an updated level activation table for the expression tree of FIG. 20 where object C is active;

FIG. 25 shows a level activation table for use with the further embodiment of FIG. 24;

FIG. 26 shows a truth table for the IN compositing operation;

FIG. 27 shows a truth table for the CLIP IN compositing operation;

FIG. 28 shows a truth table for the OUT compositing operation;

FIG. 29 shows a truth table for the CLIP OUT compositing operation; and

DETAILED DESCRIPTION INCLUDING BEST MODE

Figure 1:
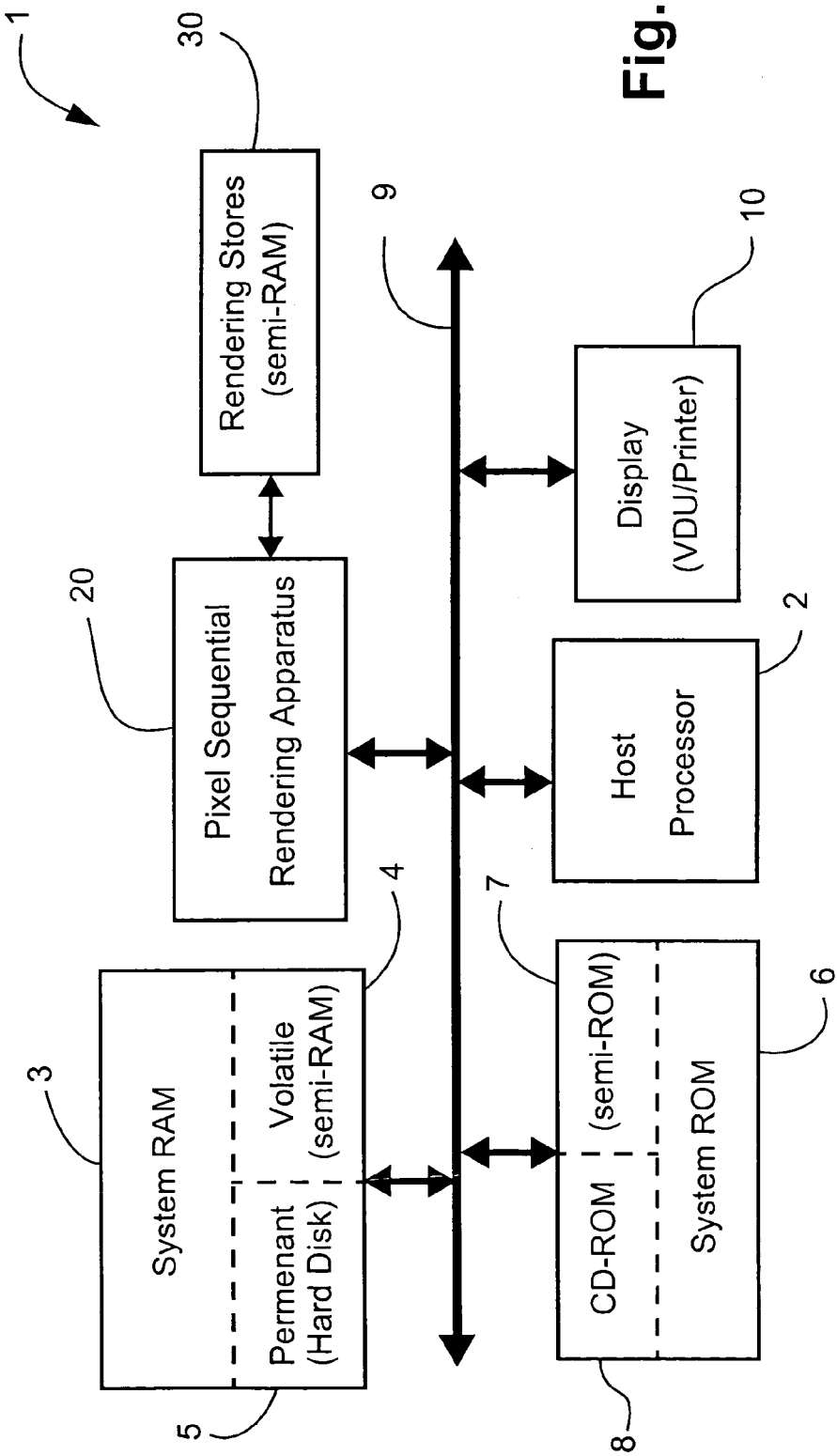
FIG. 1 is a schematic block diagram representation of a computer system incorporating the preferred embodiment.

Where reference is made in any one or more of the accompanying drawings to steps and/or features, which have the same reference numerals, those steps and/or features have for the purposes of this description the same function(s) or operation(s), unless the contrary intention appears.

FIG. 1 illustrates schematically a computer system 1 configured for rendering and presentation of computer graphic object images. The system includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both of which operate in raster fashion.

The above-described components of the system 1 are interconnected via a bus system 9 and are operable in a normal operating mode of computer systems well known in the art, such as IBM PC/AT type personal computers and arrangements evolved therefrom, Sun Sparcstations and the like.

Also seen in FIG. 1, a pixel sequential rendering apparatus 20 connects to the bus 9, and in the preferred embodiment is configured for the sequential rendering of pixel-based images derived from graphic object-based descriptions supplied with instructions and data from the system 1 via the bus 9. The apparatus 20 may utilise the system RAM 3 for the rendering of object descriptions although preferably the rendering apparatus 20 may have associated therewith a dedicated rendering store arrangement 30, typically formed of semiconductor RAM.

The general principles of the invention have application in generating instructions for directed acyclic graphs, and specifically expression trees. This is realized in the preferred embodiment in an activity determination and instruction generation module 500 (FIG. 5) of the pixel sequential rendering apparatus 20. This module is described in more detail in the section herein entitled "3.0 *Activity Determination and Instruction Generation Module*".

Figure 2:
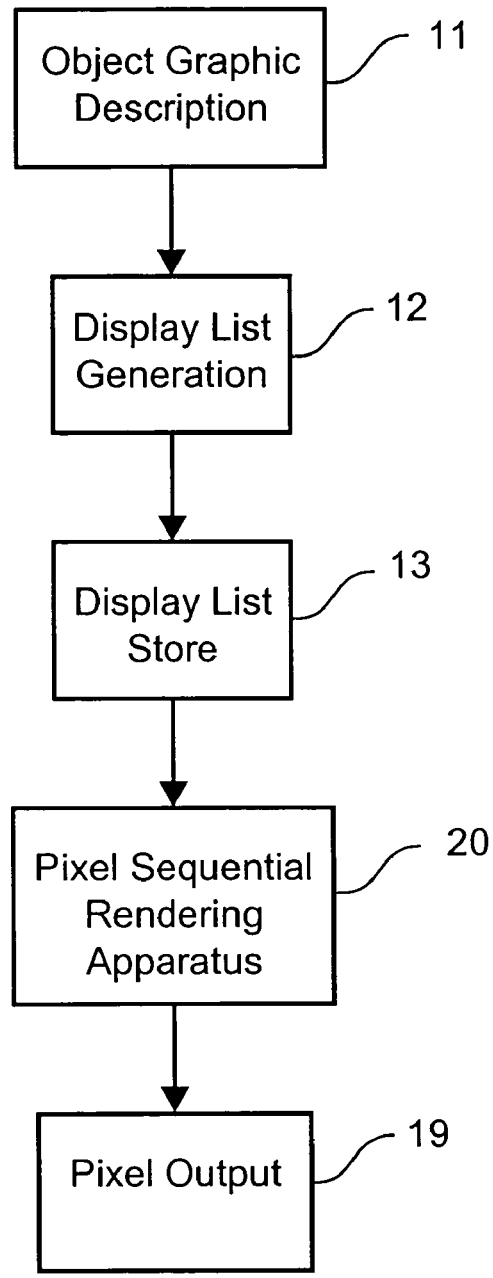
FIG. 2 is a block diagram showing the functional data flow of the preferred embodiment.

Referring now to FIG. 2, the overall functional data flow diagram of the preferred embodiment is shown. The functional flow diagram of FIG. 2 commences with an object graphic description 11 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 20 to render therefrom pixel-based images. For example, the object graphic description 11 may incorporate objects with edges in a number of formats including straight edges (simple vectors) that traverse from one point on the display to another, or an orthogonal edge format where a two-dimensional object is defined by a plurality of edges including orthogonal lines. Further formats, where objects are defined by continuous curves, are also appropriate and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

For example, FIG. 14A shows a prior art edge description of an edge 600 that is required to be divided into two segments 601 and 602 in order for the segments to be adequately described and rendered. This arises because the prior art edge description, whilst being simply calculated through a quadratic expression, could not accommodate an inflexion point 604. Thus the edge 600 was dealt with as two separate edges having end points 603 and 604, and 604 and 605 respectively. FIG. 14B shows a cubic spline 610 which is described by end points 611 and 612, and control points 613 and 614. This format requires calculation of a cubic polynomial for render purposes and thus is expensive of computational time.

FIGS. 14C and 14D show examples of edges applicable to the preferred embodiment. In the preferred embodiment, a edge is considered as a single entity and if necessary, is partitioned to delineate sections of the edge that may be described in different formats, a specific goal of which is to ensure a minimum level of complexity for the description of each section.

In FIG. 14C, a single edge 620 is illustrated spanning between scan lines A and M. An edge is described by a number of parameters including start_x, start_y, one or more segment descriptions which include an address that points to the next segment in the edge, and a finish segment used to terminate the edge. According to the preferred embodiment, the edge 620 may be described as having three step segments, a vector segment, and a quadratic segment. A step segment is simply defined as having an x-step value and a y-step value. For the three step segments illustrated, the segment descriptions are [0,2], [+2,2], and [+2,0]. Note that the x-step value is signed thereby indicating the direction of the step, whilst the y-step value is unsigned as such is always in a raster scan direction of increasing scan line value. The next segment is a vector segment which typically requires parameters start_x, start_y, finish_y and slope (DX). In this example, because the vector segment is an intermediate segment of the edge 620, the start_x and start_y may be omitted because such arise from the preceding segment(s). The slope value (DX) is signed and is added to the x-value of a preceding scan line to give the x-value of the current scan line, and in the illustrated case, DX=+1. The next segment is a quadratic segment which has a structure corresponding to that of the vector segment, but also a second order value (DDX) which is also signed and is added to DX to alter the slope of the segment.

FIG. 14D shows an example of a cubic curve according the preferred embodiment which includes a description corresponding to the quadratic segment save for the addition of a signed third-order value (DDDX), which is added to DDX to vary the rate of change of slope of the segment. Many other orders may also be implemented.

It will be apparent from the above that the ability to handle plural data formats describing edge segments allows for simplification of edge descriptions and evaluation, without reliance on complex and computationally expensive mathematical operations. In contrast, in the prior art system of FIG. 14A, all edges, whether, orthogonal, vector or quadratic, were required to be described by the quadratic form.

The operation of the preferred embodiment will be described with reference to the simple example of rendering an image 78 shown in FIG. 8. The image 78 is seen to include two graphical objects, in particular, a partly transparent blue-coloured triangle 80 rendered on top of and thereby partly obscuring an opaque red coloured rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 9A. In this connection, edge 92 commences at pixel location (40, 35) and extends in a raster direction down the screen to terminate at pixel position (40,105). Similarly, the edge 94 extends from pixel position (160,35) to position (160,105). The horizontal portions of the rectangular graphic object 90 may be obtained merely by scanning from the edge 92 to the edge 94 in a rasterised fashion.

The blue triangular object 80 however is defined by three object edges 82, 84 and 86, each seen as vectors that define the vertices of the triangle. Edges 82 and 84 are seen to commence at pixel location (100,20) and extend respectively to pixel locations (170,90) and (30,90). Edge 86 extends between those two pixel locations in a traditional rasterised direction of left to right. In this specific example because the edge 86 is horizontal like the edges 96 and 98 mentioned above, is it not essential that the edge 86 be defined, since the edge 86 is characterised by the related endpoints of the edges 82 and 84. In addition to the starting and ending pixel locations used to describe the edges 82 and 84, each of these edges will have associated therewith the slope value in this case +1 and −1 respectively.

Figure 10:
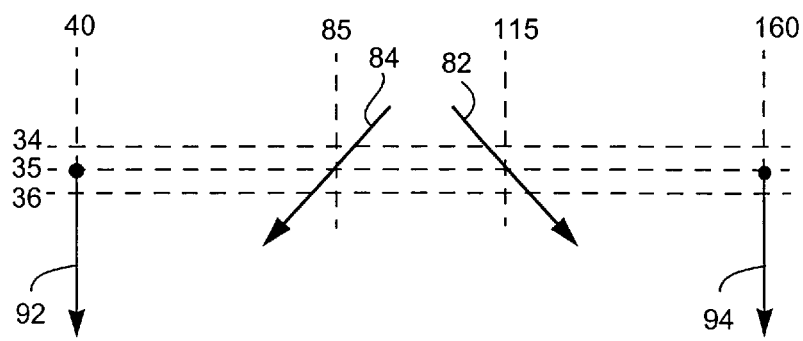
FIG. 10 illustrates the rendering of a number of scan lines of the image of FIG. 8.
Figure 11:
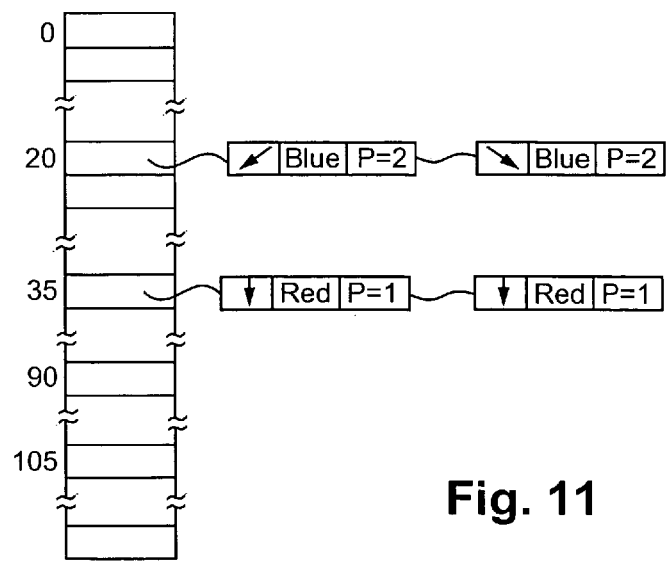
FIG. 11 depicts the arrangement of an edge record for the image of FIG. 8.

FIG. 10 shows the manner in which the rectangle 90 is rendered, this commencing on scan line 35 and how the edges 82 and 84 intersect the scan line 35. It will be apparent from FIG. 10 that the rasterisation of the image 78 requires resolution of the two objects 90 and 80 in such a fashion that the object having the higher priority level is rendered "above" that with a lower priority level. This is seen from FIG. 11 which represents an edge list record used for the rendering of the image 78. The record of FIG. 11 includes two entries, one for each of the objects, and which are arranged at a scan line value corresponding to the start, in a raster rendering order, of the respective object. It will be seen from FIG. 11 that the edge records each have an associated priority level of the object and further detail regarding the nature of the edge being described (eg. colour, slope, etc.)

Returning to FIG. 2, having identified the data necessary to describe the graphic objects to the rendered, the graphic systems 1 then performs a display list generation step 12.

Figure 3:
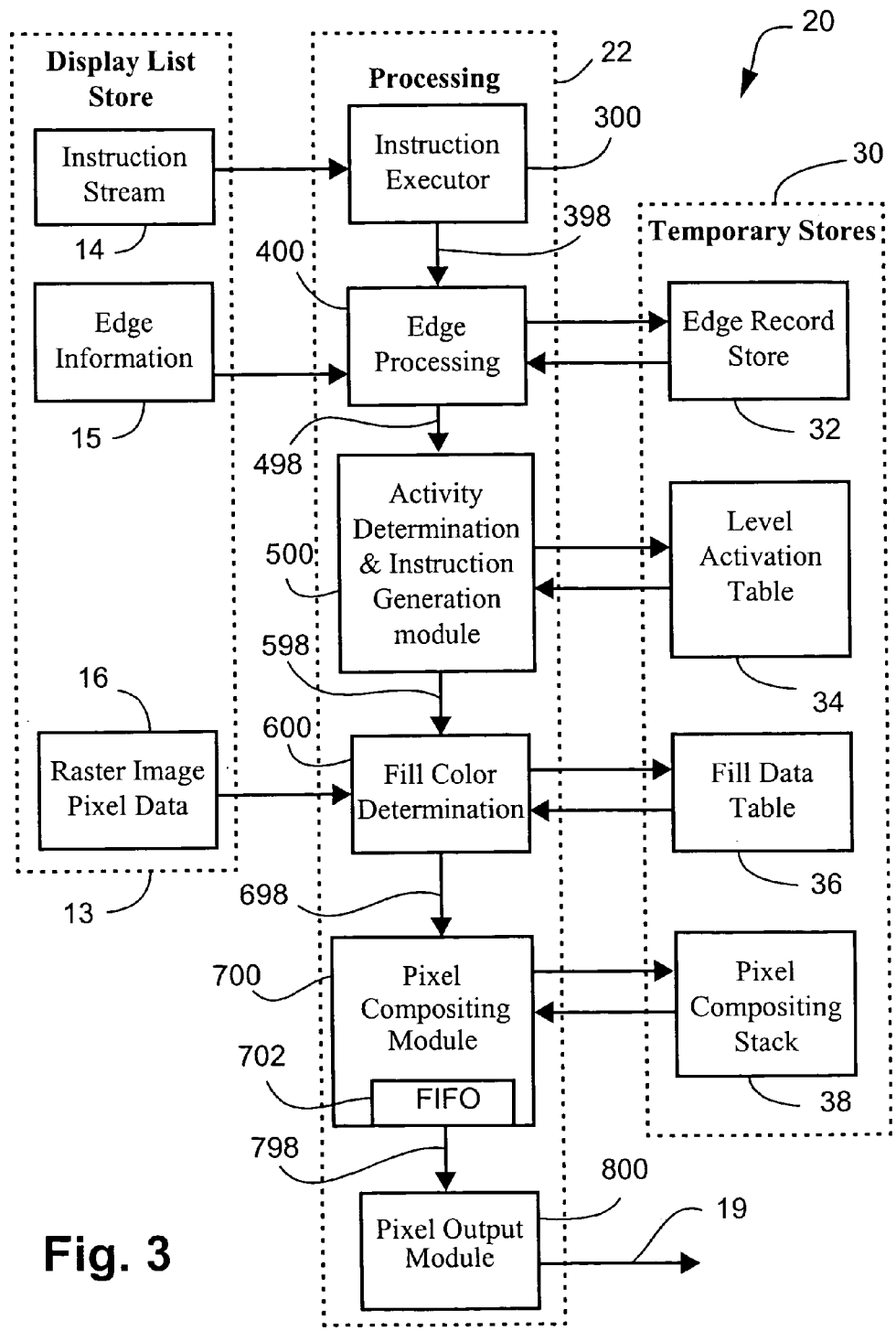
FIG. 3 is a schematic block diagram representation of the pixel sequential rendering apparatus and associated display list and temporary stores of the preferred embodiment.

The display list generation 12 is preferably implemented as a software module executing on the host processor 2 with attached ROM 6 and RAM 3. The display list generation 12 converts an object graphics description, expressed in any one or more of the well known graphic description languages, graphic library calls, or any other application specific format, into a display list. The display list is typically written into a display list store 13, generally formed within the RAM 4 but which may alternatively be formed within the rendering stores 30. As seen in FIG. 3, the display list store 13 can include a number of components, one being an instruction stream 14, another being edge information 15 and where appropriate, raster image pixel data 16.

The instruction stream 14 includes code interpretable as instructions to be read by the pixel sequential rendering apparatus 20 to render the specific graphic objects desired in any specific image. For the example of the image shown in FIG. 8, the instruction stream 14 could be of the form of:

(1) render (nothing) to scan line 20;
(2) at scan line 20 add two blue edges 82 and 84;
(3) render to scan line 35;
(4) at scan line 35 add two red edges 92 and 94;
(5) render to completion.

Figure 8:
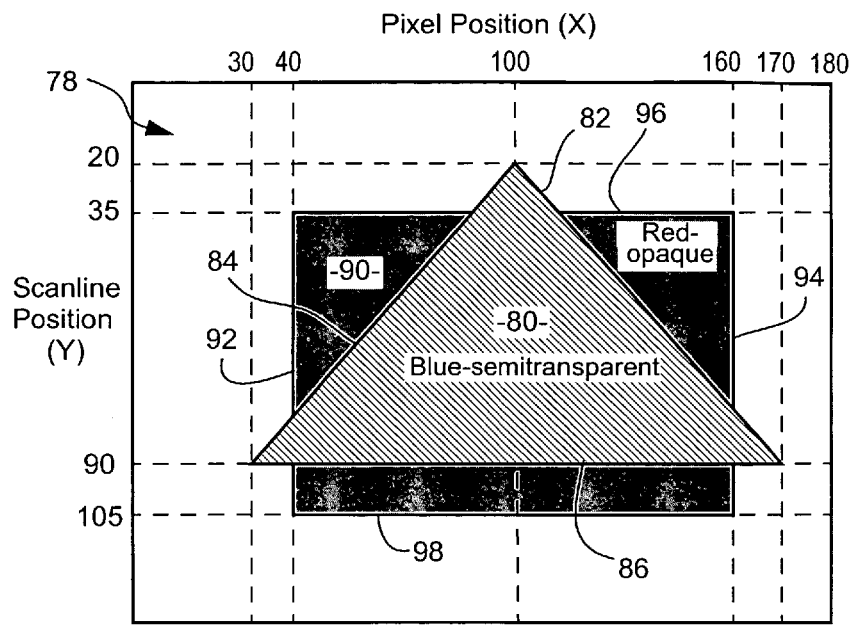
FIG. 8 illustrates a two-object image used as an example for explaining the operation of preferred embodiment.
Figure 9A:
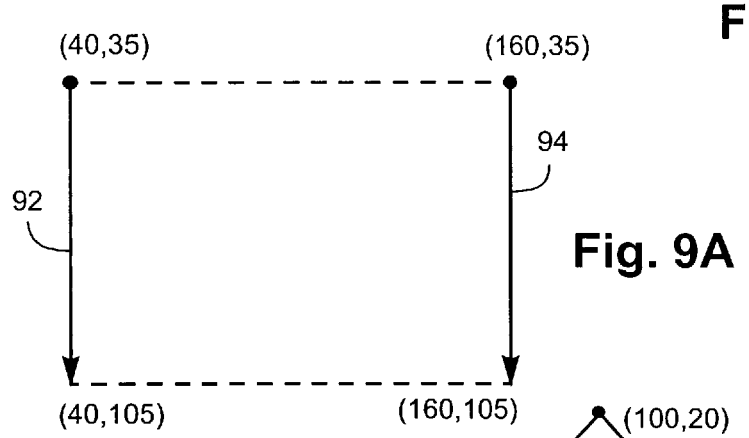
FIGS. 9A and 9B illustrate the vector edges of the objects of FIG. 8.
Figure 9B:
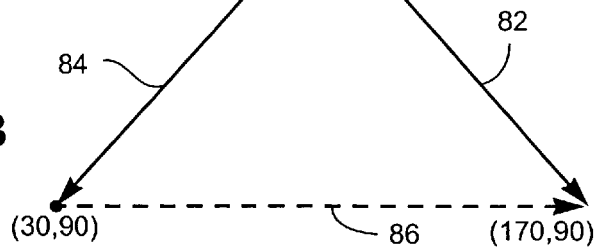

Similarly, the edge information 15 for the example of FIG. 8 may include the following:

edge 84 commences at pixel position 100, edge 82 commences at pixel position 100;
edge 92 commences at pixel position 40, edge 94 commences at pixel position 160;
edge 84 runs for 70 scan lines, edge 82 runs for 70 scan lines;
edge 84 has slope=−1, edge 84 has slope=+1;
edge 92 has slope=0 edge 94 has slope=0; and
edges 92 and 94 each run for 70 scan lines.

It will be appreciated from the above example of the instruction stream 14 and edge information 15, and the manner in which each are expressed, that in the image 78 of FIG. 8, the pixel position (X) and the scan line value (Y) define a single output space in which the image 78 is rendered. Other output space configurations however can be realised using the principles of the present disclosure.

FIG. 8 includes no raster image pixel data and hence none need be stored in the store portion 16 of the display list 13, although this feature will be described later.

The display list store 13 is read by a pixel sequential rendering apparatus 20, which is typically implemented as an integrated circuit. The pixel sequential rendering apparatus 20 converts the display list into a stream of raster pixels which can be forwarded to another device, for example, a printer, a display, or a memory store.

Although the preferred embodiment describes the pixel sequential rendering apparatus 20 as an integrated circuit, it may be implemented as an equivalent software module executable on a general purpose processing unit, such as the host processor 2. The software module may form part of a computer program product which may be delivered to a user via a computer readable medium, such as a disk device or computer network.

FIG. 3 shows the configuration of the pixel sequential rendering apparatus 20, the display list store 13 and the temporary rendering stores 30. The processing stages 22 of the pixel-sequential render apparatus 20 include:

an instruction executor 300 (which is described in more detail in the section herein entitled "1.0 *Instruction Executor*");

an edge processing module 400 (which is described in more detail in the section herein entitled "2.0 *Edge Processing Module*");

an activity determination and instruction generation module 500 (which is described in more detail in the section herein entitled "3.0 *Activity Determination and Instruction Generation Module*");

a fill colour determination module 600 (which is described in more detail in the section herein entitled "4.0 *Fill Colour Determination Module*");

a pixel compositing module 700 (which is described in more detail in the section herein entitled "5.0 *Pixel Compositing Module*"); and a pixel output module 800 (which is described in more detail in the section herein entitled "6.0 *Pixel Output Module*").

The processing operations use the temporary stores 30 which as noted above, may share the same device (eg. magnetic disk or semiconductor RAM) as the display list store 13, or may be implemented as individual stores for reasons of speed optimisation. The edge processing module 400 uses an edge record store 32 to hold edge information which is carried forward from scan-line to scan-line. The activity determination and instruction generation module 500 uses a level activation table 34 to hold information about operator performance, and the current state of the activity of each region with respect to edge crossings while a scan-line is being rendered. The fill colour determination module 600 uses a fill data table 36 to hold information required to determine the fill colour of a particular priority at a particular position. The pixel compositing module 700 uses a pixel compositing stack 38 to hold intermediate results during the determination of an output pixel that requires the colours from multiple priorities to determine its value.

The display list store 13 and the other stores 32-38 detailed above may be implemented in RAM or any other data storage technology.

The processing steps shown in the embodiment of FIG. 3 take the form of a processing pipeline 22. In this case, the modules of the pipeline may execute simultaneously on different portions of image data in parallel, with messages passed between them as described below. In another embodiment, each message described below may take the form of a synchronous transfer of control to a downstream module, with upstream processing suspended until the downstream module completes the processing of the message.

1.0 Instruction Executor

The instruction executor 300 reads and processes instructions from the instruction stream 14 and formats the instructions into messages that are transferred via an output 398 to the other modules 400, 500, 600 and 700 within the pipeline 22. In the preferred embodiment, the instruction stream 14 may include the instructions:

LOAD_PRIORITY_PROPERTIES: This instruction is associated with data to be loaded into the level activation table 34, and an address in that table to which the data is to be loaded. When this instruction is encountered by the instruction executor 300, the instruction executor 300 issues a message for the storage of the data in the specified location of the level activation table 34. This may be accomplished by formatting a message containing this data and passing it down the processing pipeline 22 to the activity determination and instruction generation module 500 which performs the store operation.

LOAD_FILL_DATA: This instruction is associated with data to be loaded into the fill data table 36, and an address in that table to which the data is to be loaded. When this instruction is encountered by the instruction executor 300, the instruction executor 300 issues a message for the storage of the data at the specified address of the fill data table 36. This may be accomplished by formatting a message containing this data and passing it down the processing pipeline 22 to the fill data determination module which performs the store operation.

LOAD_NEW_EDGES_AND_RENDER: This instruction is associated with an address in the display list store 13 of new edges 15 which are to be introduced into the rendering process when a next scan line is rendered. When this instruction is encountered by the instruction executor, the instruction executor 300 formats a message containing this data and passes it to the edge processing module 400. The edge processing module 400 stores the address of the new edges in the edge record store 32. The edges at the specified address are sorted on their initial scan line intersection coordinate before the next scan line is rendered. In one embodiment, the edges are sorted by the display list generation process 12. In another embodiment, the edges are sorted by the pixel-sequential rendering apparatus 20.

SET_SCAN LINE_LENGTH: This instruction is associated with a number of pixels which are to be produced in each rendered scan line. When this instruction is encountered by the instruction executor 300, the instruction executor 300 passes the value to the edge processing module 400 and the pixel compositing module 700.

SET_OPACITY_MODE: This instruction is associated with a flag which indicates whether pixel compositing operations will use an opacity channel (also known in the art as an alpha channel). When this instruction is encountered by the instruction executor 300, the instruction executor 300 passes the flag value in the pixel compositing module 700.

The instruction executor 300 is typically formed by a microcode state machine which maps instructions and decodes them into pipeline operations for passing to the various modules. A corresponding software process may alternatively be used.

2.0 Edge Processing Module

The operation of the edge processing module 400 during a scan line render operation will now be described with reference to FIG. 4. The initial conditions for the rendering of a scan line is the availability of three lists of edge records. Any or all of these lists may be empty. These lists are a new edge list 402, obtained from the edge information 15 and which contains new edges as set by the LOAD_NEW_EDGES_AND_RENDER instruction, a main edge list 404 which contains edge records carried forward from the previous scan line, and a spill edge list 406 which also contains edge records carried forward from the previous scan line. Each edge record may include:

(i) a current scan line intersection coordinate (referred to here as the X coordinate), (ii) a count (referred to herein as NY) of how many scan lines a current segment of this edge will last for (in some embodiments this may be represented as a Y limit), (iii) a value to be added to the X coordinate of this edge record after each scan line (referred to here as the DX), (iv) a value to be added to the DX of this edge record after each scan line (referred to here as the DDX), (v) one or more priority numbers (P), (vi) a direction (DIR) flag which indicates whether the edge crosses scan lines in an upward (+) or a downward (−) manner, and (vii) an address (ADD) of a next edge segment in the list.

Such a format accommodates vectors, orthogonally arranged edges and quadratic curves. The addition of further parameters, DDDX for example, may allow such an arrangement to accommodate cubic curves. In some applications, such as cubic Bezier spline, a 6-order polynomial (ie: up to DDDDDDX) may be required.

For the example of the edges 84 and 94 of FIG. 8, the corresponding edge records at scan line 20 could read as follows in the Table as shown in FIG. 16 of the drawings:

In this description, coordinates which step from pixel to pixel along a scan line being generated by the rendering process will be referred to as X coordinates, and coordinates which step from scan line to scan line will be referred to as Y coordinates. Preferably, each edge list contains zero or more records placed contiguously in memory. Other storage arrangements, including the use of pointer chains, are also possible. The records in each of the three lists 402, 404 and 406 are arranged in order of scan line intersection (X) coordinate. This is typically obtained by a sorting process, initially managed by an edge input module 408 which receives messages, including edge information, from the instruction executor 300. It is possible to relax the sort to only regard the integral portion of each scan line intersection coordinate as significant. It is also possible to relax the sort further by only regarding each scan line intersection coordinate, clamped to the minimum and maximum X coordinates which are being produced by the current rendering process. Where appropriate, the edge input module 408 relays messages to modules 500, 600 and 700 downstream in the pipeline 22 via an output 498.

The edge input module 408 maintains references into and receives edge data from each of the three lists 402, 404, and 406. Each of these references is initialised to refer to the first edge in each list at the start of processing of a scan line. Thereafter, the edge input module 408 selects an edge record from one of the three referenced edge records such that the record selected is the one with the least X coordinate out of the three referenced records. If two or more of the X-records are equal, each are processed in any order and the corresponding edge crossings output in the following fashion. The reference which was used to select that record is then advanced to the next record in that list. The edge just selected is formatted into a message and sent to an edge update module 410. Also, certain flags of the edge, in particular the current X, the priority numbers, and the direction flag, are formatted into a message which is forwarded to the activity determination and instruction generation module 500 as an output 498 of the edge processing module 400. Embodiments which use more or fewer lists than those described here are also possible.

Upon receipt of an edge, the edge update module 410 decrements the count of how many scan lines for which a current segment will last. If that count has reached zero, a new segment is read from the address indicated by the next segment address. A segment specifies:

(i) a value to add to the current X coordinate immediately the segment is read,
(ii) a new DX value for the edge,
(iii) a new DDX value for the edge, and
(iv) a new count of how many scan lines for which the new segment will last.

If there is no next segment available at the indicated address, no further processing is performed on that edge. Otherwise, the edge update module 410 calculates the X coordinate for the next scan line for the edge. This typically would involve taking the current X coordinate and adding to it the DX value. The DX may have the DDX value added to it, as appropriate for the type of edge being handled. The edge is then written into any available free slot in an edge pool 412, which is an array of two or more edge records. If there is no free slot, the edge update module 410 waits for a slot to become available. Once the edge record is written into the edge pool 412, the edge update module 410 signals via a line 416 to an edge output module 414 that a new edge has been added to the edge pool 412.

Figure 4:
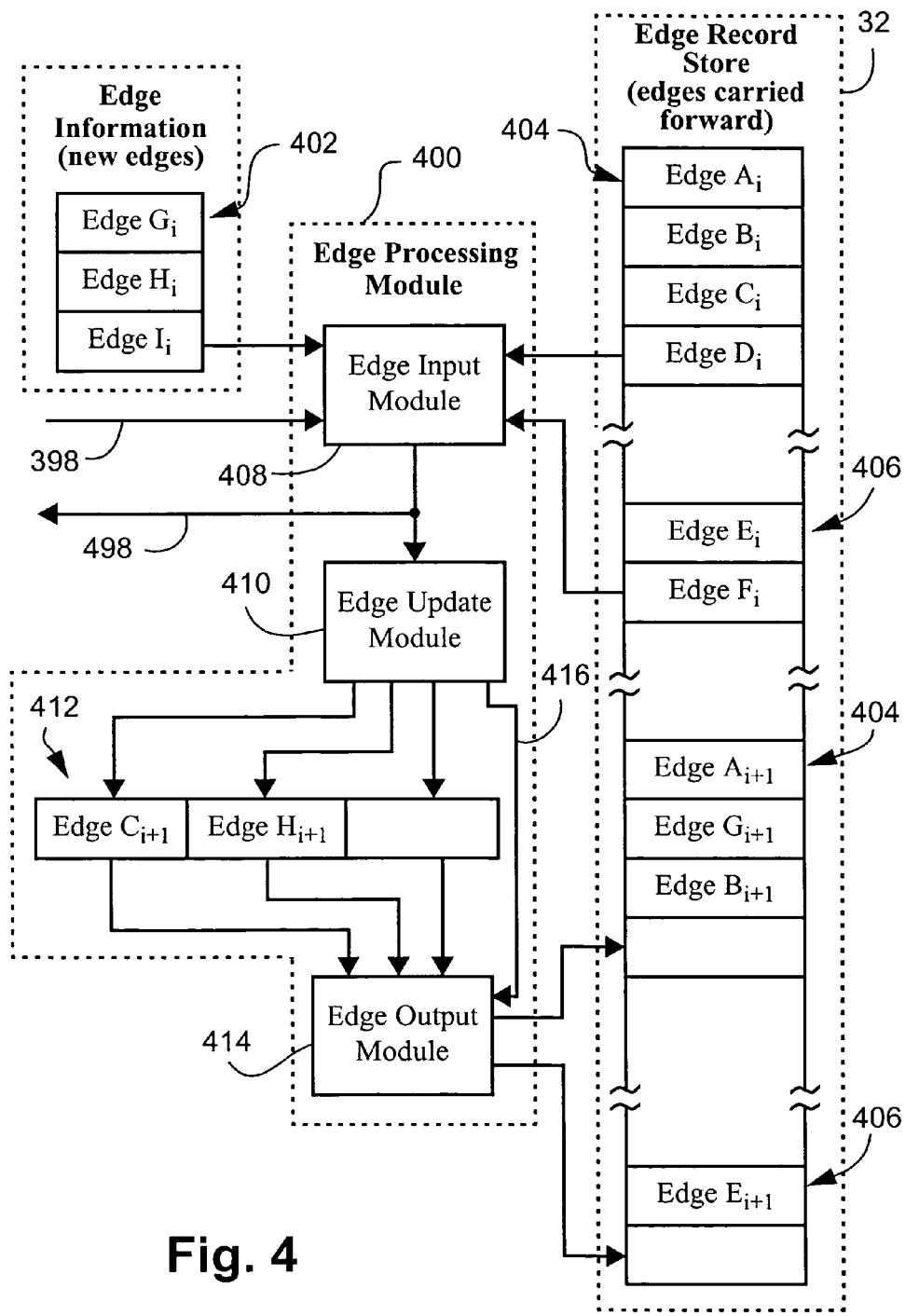
FIG. 4 is a schematic functional representation of the edge processing module of FIG. 2.

As an initial condition for the rendering of a scan line, the edge output module 414 has references to each of a next main edge list 420 and a next spill edge list 422, not seen in FIG. 4 but associated with the lists 404 and 406 in the edge record 32. Each of these references is initialised to the location where the, initially empty, lists 420 and 422 may be built up. Upon receipt of the signal 416 indicating that an edge has been added to the edge pool 412, the edge output module 414 determines whether or not the edge just added has a lesser X coordinate than the edge last written to the next main edge list 420 (if any). If this is true, a "spill" is said to have occurred because the edge cannot be appended to the main edge list 404 without violating its ordering criteria. When a spill occurs, the edge is inserted into the next spill edge list 422, preferably in a manner that maintains a sorted next spill edge list 422. For example this may be achieve using a software sorting routine. In some embodiments spills may be triggered by other conditions, such as excessively large X coordinates.

If the edge added to the edge pool 412 has an X coordinate greater than or equal to the edge last written to the next main edge list 420 (if any), and there are no free slots available in the edge pool 412, the edge output module 414 selects the edge from the edge pool 412 which has the least X coordinate, and appends that edge to the next main edge list 420, extending it in the process. The slot in the edge pool 412 which was occupied by that edge is then marked as free.

Once the edge input module 408 has read and forwarded all edges from all three of its input lists 402, 404 and 406, it formats a message which indicates that the end of scan line has been reached and sends the message to both the activity determination and instruction generation module 500 and the edge update module 410. Upon receipt of that message, the edge update module 410 waits for any processing it is currently performing to complete, then forwards the message to the edge output module 414. Upon receipt of the message, the edge output module 414 writes all remaining edge records from the edge pool 412 to the next main edge list 404 in X order. Then, the reference to the next main edge list 420 and the main edge list 404 are exchanged between the edge input module 408 and the edge output module 414, and a similar exchange is performed for the next spill edge list 422 and the spill edge list 406. In this way the initial conditions for the following scan line are established.

Rather than sorting the next spill edge list 422 upon insertion of edge records thereto, such edge records may be merely appended to the list 422, and the list 422 sorted at the end of the scan line and before the exchange to the current spill list 406 becomes active in edge rasterisation of the next scan line. Other methods of sorting the edges involving fewer or more lists may be used, as well as different sorting algorithms.

It can be deduced from the above that edge crossing messages are sent to the activity determination and instruction generation module 500 in scan line and pixel order (that is, they are ordered firstly on Y and then on X) and that each edge crossing message is labelled with the priority to which it applies.

FIG. 12A depicts a specific structure of an active edge record 418 that may be created by the edge processing module 400 when a segment of an edge is received. If the first segment of the edge is a step (orthogonal) segment, the X-value of the edge is added to a variable called "X-step" for the first segment to obtain the X position of the activated edge. Otherwise, the X-value of the edge is used. This means that the edges in the new edge record must be sorted by $X_{edge}+X_{step}$. The $X_{step}$ of the first segment should, therefore, be zero, in order to simplify sorting the edges. The Y-value of the first segment is loaded into the NY field of the active edge record 418. The DX field of the active edges copied from the DX field identifier of vector or quadratic segments, and is set to zero for a step segment. A u-flag as seen in FIG. 12A is set if the segment is upwards heading (see the description relating to FIG. 13A). A q-flag is set if the segment is a quadratic segment, and cleared otherwise. An i-flag is provided and is set if the segment is invisible. A d-flag is set when the edge is used as a direct clipping object, without an associated clipping level, and is applicable to closed curves. The actual priority level of the segment, or a level address is copied from the corresponding field of the new edge record into a level (ADDR) field in the active edge record 418. A segment address/DDX field of the active edge record 418 is either the address of the next segment in the segment list or copied from the segment's DDX value, if the segment is quadratic. The segment address is used to terminate an edge record. As a consequence, in the preferred embodiment, any quadratic curve (ie: that uses the DDX filed) will be a terminal segment of an edge record.

It will be appreciated from FIG. 12A that other data structures are also possible, and necessary for example where higher-order polynomial implementations are used. Further, the segment address and the DDX field may be separated into different fields, and additional flags provided to meet alternate implementations.

FIG. 12B depicts the arrangement of the edge records described above in the preferred embodiment and used in the edge processing module 400. The edge pool 412 is supplemented by a new active edge record 428, a current active edge record 430 and a spill active edge record 432. As seen in FIG. 12B, the records 402, 404, 406, 420 and 422 are dynamically variable in size depending upon the number of edges being rendered at any one time. Each record includes a limit value which, for the case of the new edge list 402, is determined by a SIZE value incorporated with the LOAD_EDGES_AND_RENDER instruction. When such an instruction is encountered, SIZE is checked and if non-zero, the address of the new edge record is loaded and a limit value is calculated which determines a limiting size for the list 402.

Although the preferred embodiments utilises arrays and associated pointers for the handling of edge records, other implementations, such as linked lists for example may be used. These other implementations may be hardware or software-based, or combinations thereof.

The specific rendering of the image 78 shown in FIG. 8 will now be described with reference to scan lines 34, 35 and 36 shown in FIG. 10. In this example, the calculation of the new X co-ordinate for the next scan line is omitted for the purposes of clarity, with FIGS. 12C to 12I illustrating the output edge crossing being derived from one of the registers 428, 430 and 432 of the edge pool 412.

FIG. 12C illustrates the state of the lists noted above at the end of rendering scan line 34 (the top portion of the semi-transparent blue triangle 80). Note that in scan line 34 there are no new edges and hence the list 402 is empty. Each of the main edge lists 404 and next main edge list 420 include only the edges 82 and 84. Each of the lists includes a corresponding pointer 434, 436, and 440 which, on completion of scan line 34, point to the next vacant record in the corresponding list. Each list also includes a limit pointer 450, denoted by an asterisk (*) which is required to point to the end of the corresponding list. If linked lists were used, such would not be required as linked lists include null pointer terminators that perform a corresponding function.

As noted above, at the commencement of each scan line, the next main edge list 420 and the main edge list 404 are swapped and new edges are received into the new edge list 402. The remaining lists are cleared and each of the pointers set to the first member of each list. For the commencement of scan line 35, the arrangement then appears as seen in FIG. 12D. As is apparent from FIG. 12D, the records include four active edges which, from FIG. 10, are seen to correspond to the edges 92, 94, 84 and 82.

Referring now to FIG. 12E, when rendering starts, the first segment of the new edge record 402 is loaded into an active edge record 428 and the first active edge records of the main edge list 404 and spill edge list 406 are copied to records 430 and 432 respectively. In this example, the spill edge list 406 is empty and hence no loading takes place. The X-positions of the edges within the records 428, 430 and 432 are then compared and an edge crossing is emitted for the edge with the smallest X-position. In this case, the emitted edge is that corresponding to the edge 92 which is output together with its priority value. The pointers 434, 436 and 438 are then updated to point to the next record in the list.

The edge for which the edge crossing was emitted is then updated (in this case by adding DX=0 to its position), and buffered to the edge pool 412 which, in this example, is sized to retain three edge records. The next entry in the list from which the emitted edge arose (in this case list 402) is loaded into the corresponding record (in this case record 428). This is seen in FIG. 12F.

Further, as is apparent from FIG. 12F, a comparison between the registers 428, 430 and 432 again selects the edge with the least X-value which is output as the appropriate next edge crossing (X=85, P=2). Again, the selected output edge is updated and added to the edge pool 412 and all the appropriate pointers incremented. In this case, the updated value is given by X←X+DX, which is evaluated as 84=85−1. Also, as seen, the new edge pointer 434 is moved, in this case, to the end of the new edge list 402.

In FIG. 12G, the next edge identified with the lowest current X-value is again that obtained from the register 430 which is output as an edge crossing (X=115, P=2). Updating of the edge again occurs with the value be added to the edge pool 412 as shown. At this time, it is seen that the edge pool 412 is now full and from which the edge with the smallest X-value is selected and emitted to the output list 420, and the corresponding limited pointer moved accordingly.

As seen in FIG. 12H, the next lowest edge crossing is that from the register 428 which is output (X=160 P=1). The edge pool 412 is again updated and the next small X-value emitted to the output list 420.

At the end of scan line 35, and as seen in FIG. 12I, the contents of the edge pool 412 are flushed to the output list 420 in order of smallest X-value. As seen in FIG. 12J, the next main edge list 420 and the main edge list 404 are swapped by exchanging their pointers in anticipation of rendering the next scan line 36. After the swapping, it is seen from FIG. 12J that the contents of the main edge list 404 include all edge current on scan line 36 arranged in order of X-position thereby permitting their convenient access which facilitates fast rendering.

Ordinarily, new edges are received by the edge processing module 400 in order of increasing X-position. When a new edge arrives, its position is updated (calculated for the next scan line to be rendered) and this determines further action as follows:

(a) if the updated position is less than the last X-position output on the line 498, the new edge is insertion sorted into the main spill list 406 and the corresponding limit register updated;

(b) otherwise, if there is space, it is retained in the edge pool 412.

As is apparent from the forgoing, the edge pool 412 aids in the updating of the lists in an ordered manner in anticipation of rendering the next scan line in the rasterised image. Further, the size of the edge pool 412 may be varied to accommodate larger numbers of non-ordered edges. However, it will be appreciated that in practice the edge pool 412 will have a practical limit, generally dependent upon processing speed and available memory with the graphic processing system. In a limiting sense, the edge pool 412 may be omitted which would ordinarily require the updated edges to be insertion sorted into the next output edge list 420. However, in the preferred embodiment this situation is avoided, as a normal occurrence through the use of the spill lists mentioned above. The provision of the spill lists allows the preferred embodiment to be implemented with an edge pool of practical size and yet handle relatively complex edge intersections without having to resort to software intensive sorting procedures. In those small number of cases where the edge pool and spill list are together insufficient to accommodate the edge intersection complexity, sorting methods may be used.

Figure 13A:
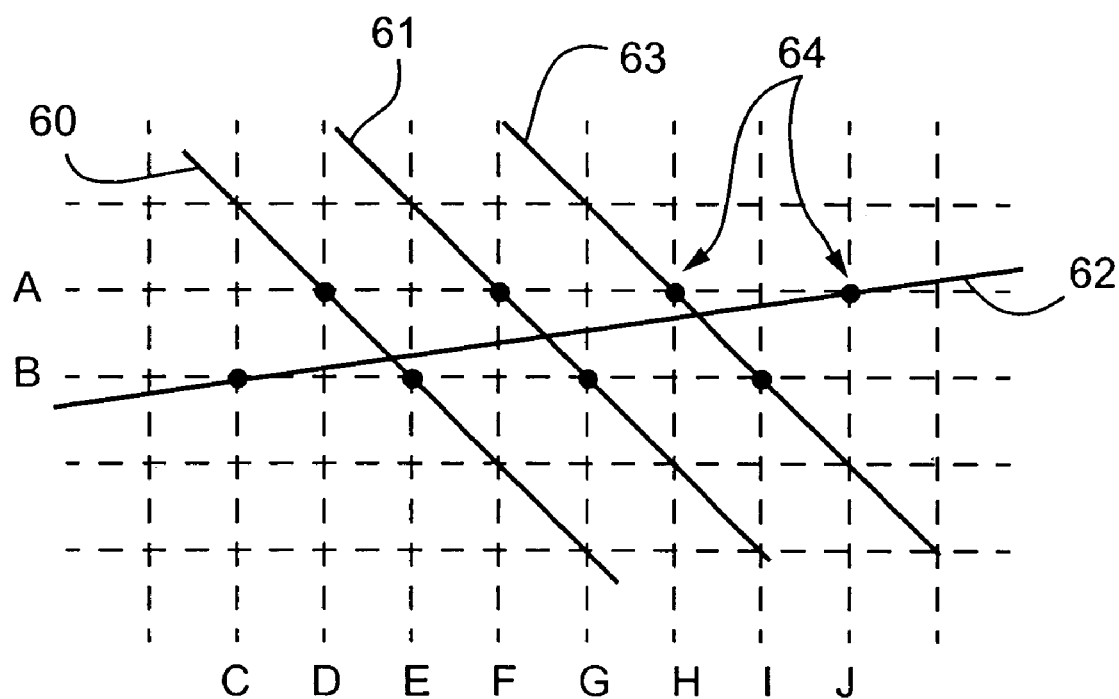

An example of where the spill list procedure is utilised is seen in FIG. 13A where three arbitrary edges 60, 61 and 63 intersect an arbitrary edge 62 at a relative position between scan lines A and B. Further, the actual displayed pixel locations 64 for each of scan lines A, B, are shown which span pixel locations C to J. In the above described example where the edge pool 412 is size to retain three edge records, it will be apparent that such an arrangement alone will not be sufficient to accommodate three edge intersections occurring between adjacent scan lines as illustrated in FIG. 13A.

Figure 13B:
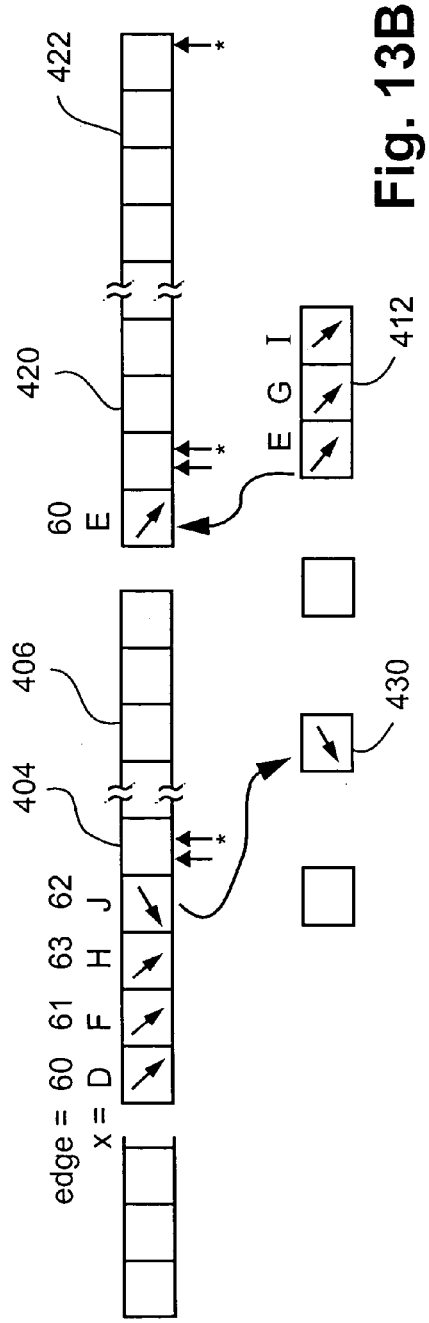

FIG. 13B shows the state of the edge records after rendering the edges 60, 61 and 63 on scan line. The edge crossing H is that most recently emitted and the edge pool 412 is full with the updated X-values E, G and I for the edges 60, 61 and 63 respectively for the next scan line, scan line B. The edge 62 is loaded into the current active edge record 430 and because the edge pool 412 is full, the lowest X-value, corresponding to the edge 60 is output to the output edge list 420.

Figure 13C:
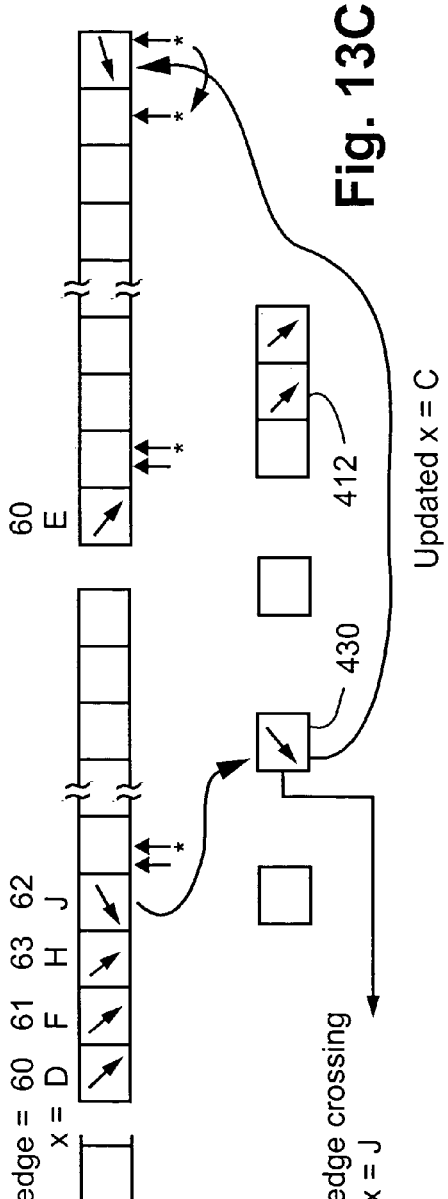

In FIG. 13C, the next edge crossing is emitted (X=J for edge 62) and the corresponding updated value determined, in this case X=C for scan line B. Because the new updated value X=C is less than the most recent value X=E copied to the output list 420, the current edge record and its corresponding new updated value is transferred directly to the output spill list 422.

FIG. 13D shows the state of the edge records at the start of scan line B where it is seen that the main and output lists, and their corresponding spill components have been swapped. To determine the first emitted edge, the edge 60 is loaded into the current active edge register 430 and the edge 62 is loaded into the spill active edge register 432. The X-values are compared and the edge 62 with the least X-value (X=C) is emitted, updated and loaded to the edge pool 412.

Edge emission and updating continues for the remaining edges in the main edge list 404 and at the end of the scan line, the edge pool 412 is flushed to reveal the situation shown in FIG. 13E, where it is seen that each of the edges 60 to 63 are appropriately ordered for rendering on the next scan line, having been correctly emitted and rendered on scan line B.

As will be apparent form the forgoing, the spill lists provide for maintaining edge rasterisation order in the presence of complex edge crossing situations. Further, by virtue of the lists being dynamically variable in size, large changes in edge intersection numbers and complexity may be handled without the need to resort to sorting procedures in all but exceptionally complex edge intersections.

In the preferred embodiment the edge pool 412 is sized to retain eight edge records and size of the lists 404, 420 together with their associated spill lists 406, 422, is dynamically variable thereby providing sufficient scope for handling large images with complex edge crossing requirements.

3.0 Activity Determination and Instruction Generation Module

Expression trees are often used to describe the compositing operations required to form an image, and typically comprise a plurality of nodes including leaf nodes, unary nodes and binary nodes. A leaf node is the outermost node of an expression tree, has no descendent nodes and represents a primitive constituent of an image, namely a graphic object. Unary nodes represent an operation, which modifies the pixel data of the object coming out of the part of the tree below the unary operator. A binary node typically branches to left and right sub-trees, wherein the sub-trees each comprise at least one leaf node. The binary node represents an operation between one object on one branch and another object on another branch.

Figure 15:
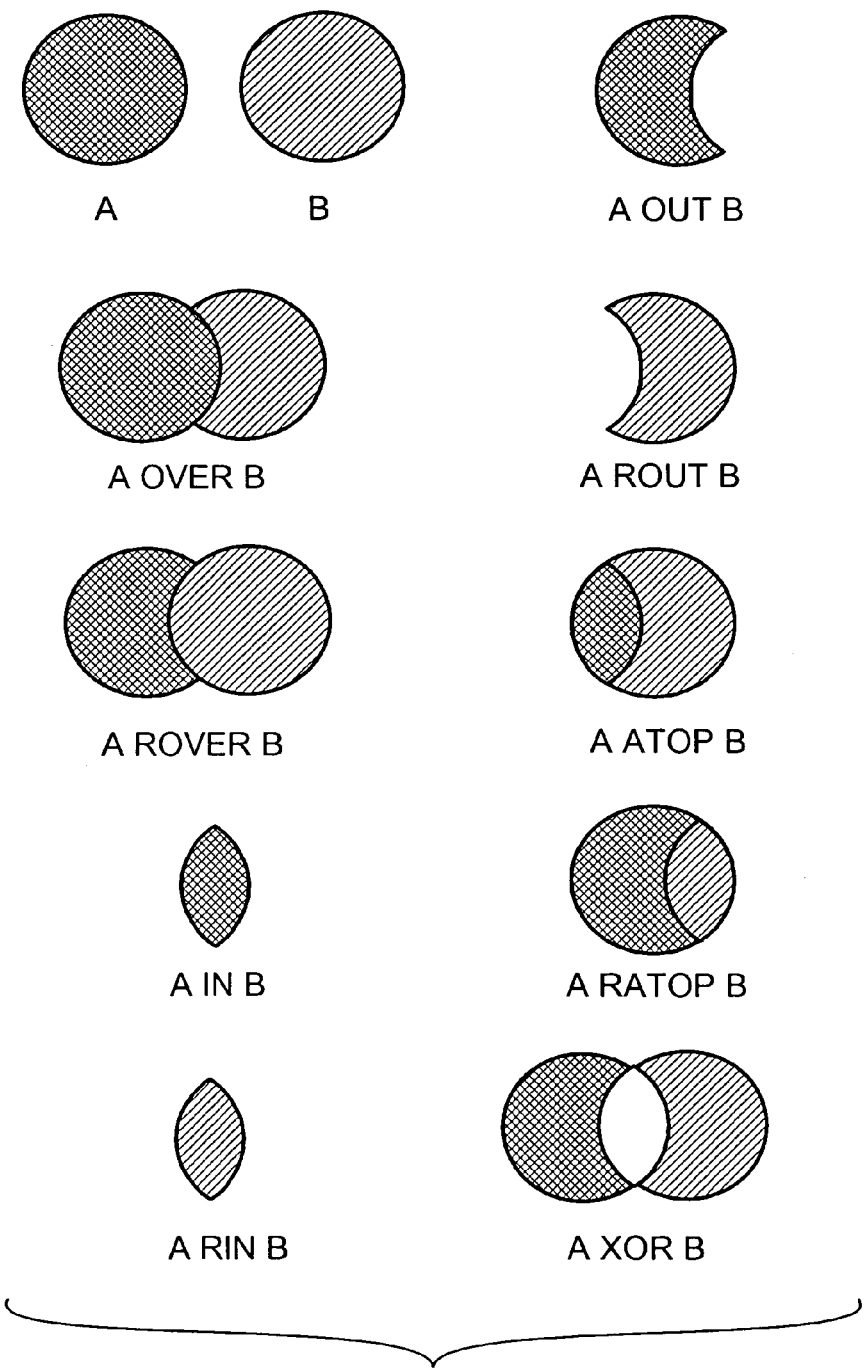
FIG. 15 depicts the result of a number of compositing operations.

Examples of such operations are described in "Compositing Digital Images", Porter, T; Duff, T; Computer Graphics, Vol. 18 No. 3 (1984) pp. 253-259. Some of these Porter and Duff compositing operations are shown in FIG. 15. For ease of illustration, the graphic objects shown in FIG. 15 are fully opaque. As can be seen, a number of these operators (e.g. out) do not provide data (e.g. colour data) in the centre overlapping region of the two objects. Generally, these operators (e.g. out) will always provide data (e.g. colour data) in the centre overlapping region of the two objects if one or both of the two objects are partially transparent. However, there are special cases where particular operators provide no data in the centre overlapping region of the two objects if one or both of the two objects are fully opaque.

Turning now to FIG. 19, there is shown a typical example of a simple expression tree and a corresponding instruction list. The expression tree comprises five leaf nodes 10, 9, 7, 6 and 0-5 describing the graphic objects A, B, C, D and PAGE respectively. The expression tree also contains nodes 8, 11, 12, and 13 each having two branches and representing the operations "out", "in", "over" and "over" respectively. The instruction list contains a list of instructions for rendering the expression tree. However, problems arise when generating an instruction list for a given pixel location because the compositing operation depends on which of the graphic objects composited by the operation are active at that given pixel location. The preferred Activity Determination and Instruction Generation Module 500 seeks to solve these problems.

Figure 5:
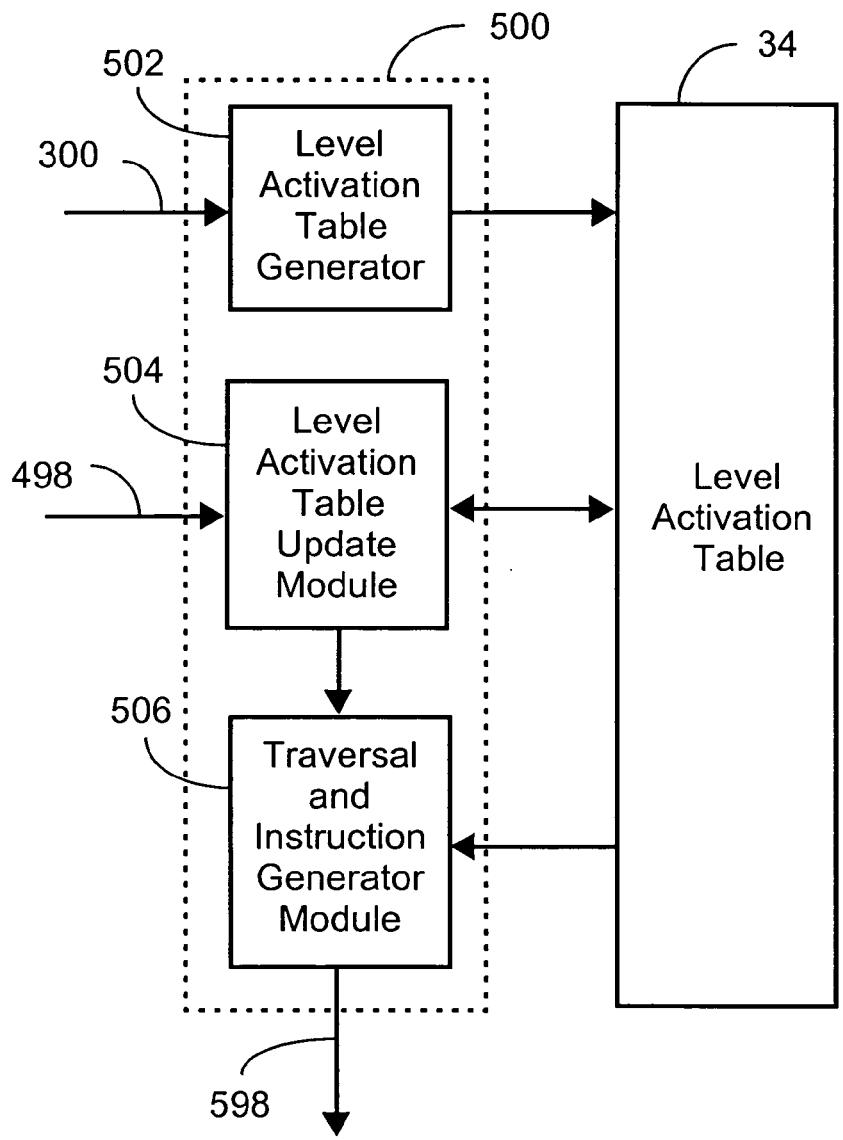
FIG. 5 is a schematic functional representation of the activity determination and instruction generation module of FIG. 2.

The operation of the Activity Determination and Instruction Generation Module 500 will now be described with reference to FIG. 5. The Instruction Generator 300 during an initialisation phase passes to the Level Activation Table Generator 502 an object graphic description of the image to be rendered. This object graphic description is in the form of an expression tree, such as for example the expression tree shown in FIG. 19. The Level Activation Table Generator 502 then generates a Level Activation Table, which is a linear form of the expression tree and stores it the Level Activation Table Store 34. The generated Level Activation Table contains a plurality of records, one record for each binary operator node, unary node and leaf node of the expression tree.

In addition, the Level Activation Table also contains fields for storing data on certain inherent properties of the binary operators, and fields for storing data on the activity of the branches of the binary operator nodes. The data concerning the properties of the binary operators is static, that is dependent on the actual operators used and not on the location of the currently scanned pixel. Consequently, this data can be generated and stored in the level activation table during the initialisation phase. However, the data concerning branch activity is dependent upon the currently scanned pixel location. During the initialisation phase, as there is no currently active pixel location, the branch activity data of the Level Activation Table is initialised as inactive.

The Pixel Sequential Rendering Apparatus 20 then commences scanning the pixel locations of the image in a raster scan order. The edge processing module 400 passes to the Level Activation Table Update Module 504, the pixel locations of the edges of the current scan line being scanned. The Level Activation Table Update Module 504 accesses the Level Activation Table from the store 34 and updates the Table depending upon which pixel location is currently being scanned. For ease of implementation, the Table is updated only once for those pixel locations between adjacent edges. This is based on the recognition that the instruction list for rendering the expression tree is the same for the group of pixel locations between any two adjacent edges of a scan line. Alternatively, the Table can be updated for each scanned pixel location.

The Traversal and Instruction Generator Module 506, then generates instructions based on this updated Level Activation Table which instructions are then passed onto the Fill Colour Determination Module 600. This process is continued for each group of pixel locations between adjacent edges until the image is rendered.

Before proceeding with any further with the description of the preferred embodiments, a brief review of terminology used herein is discussed.

Turning now to FIGS. 18A and 18B, there is shown a binary operation (illustrated as an expression tree) between a source object L and a destination object R. The expression tree has a binary node OP with a left branch to the object L and right branch to the object R. An object is considered to be active at a pixel if the currently scanned pixel is inside the boundary edges, which apply to the object. If the pixel is outside the boundary edges then the object is inactive at that pixel. Thus the object will be active during the scanning of those group of pixels inside the boundary edges. The branch of an operator to an object is considered to be active if the object is active.

Regardless of the actual operation being performed, the binary operation of FIG. 18A resolves into four regions of activity as indicated below:

Region 1. L object active, R object inactive (L∩$\overline{R}$)
Region 2. L object active, R object active (L∩R);
Region 3. L object inactive, R object active ($\overline{L}$∩R); and
Region 4. L object inactive, R object inactive ($\overline{L}$∩$\overline{R}$).

Region 4 always results in no operation (NOP) being required to be performed and as a consequence, there exists three different combinations of active levels for a binary tree. For ease of explanation, the region (L∩$\overline{R}$) is referred to herein as the left node region, or left region, the region ($\overline{L}$∩R) is referred to herein as the right node region, or right region, and the region (L∩R) is referred to herein as the common region. The left node region and the right node region are associated with the left and right branches of the parent node respectively and correspond to the objects operator order (eg L op R) and not their location in the image.

For the purposes of this description, a binary operator is considered to be active if it provides data up the tree. The activity of a binary operator is an inherent property of the operator itself and the activity of its left and right branches.

As an example, compare the "out" operator of FIG. 15 with FIG. 18A. The "out" operator has the inherent property of passing data up the tree for the region (L∩$\overline{R}$) irrespective of whether the top (left branch) object is partially transparent or opaque; and in the common region (L∩R) only if the lower (right branch) object is partially transparent. In the former case, this will only occur when its left branch becomes active and right branch inactive for the currently scanned group of pixels. In the latter case, this will only occur when the right and left branches are both active for the currently scanned group of pixels. On the other hand, the "out" operator has the inherent property of passing no data up the tree for the region ($\overline{L}$∩R), irrespective of whether the lower (right branch) object is partially transparent or opaque.

As another example, compare the "in" operator of FIG. 15 with FIG. 18A. The "in" operator has the inherent property of passing data (eg colour data) up the tree for the region (L∩R). However, this will only occur when its left and right branches are active. On the other hand, the "in" operator has the inherent property of passing no data up the tree for the regions ($\overline{L}$∩R) and (L∩$\overline{R}$).

As another example, compare the "rout" operator of FIG. 15 with FIG. 18A. The "rout" operator has the inherent property of passing data up the tree for the region ($\overline{L}$∩R), irrespective of whether the top (right branch) object is partially transparent or opaque; and in the common region (L∩R) only if the lower (left branch) object is partially transparent. In the former case, this will only occur when its left branch becomes active and right branch inactive for the currently scanned group of pixels. In the latter case, this will only occur when the right and left branches are both active for the currently scanned group of pixels. On the other hand, the "rout" operator has the inherent property of passing no data up the tree for the region (L∩$\overline{R}$), irrespective of whether the lower (left branch) object is partially transparent or opaque.

It should be noted that there is a distinction between the performance of a binary operator and its activity. A binary operator will only perform an operation when both its branches are active. Otherwise, the result is taken directly from the active branch, if required by the operator.

The Activity Determination and Instruction Generation Module 500 traverses and generates instructions depending upon of the activity of the binary operators, the activity of the branches of the expression tree, and the activity of the graphic objects (leaf nodes).

The manner in which these instructions are generated will be described with reference to the example shown in FIG. 20. FIG. 20 shows the expression tree of FIG. 19, where object C is active and shows a corresponding instruction list generated by the Activity Determination and Instruction Generation Module 500. The Module 500 initially determines the aforementioned inherent properties of the operators of the expression tree. These properties are permanently stored (not shown) for retrieval and use by the module 500. In the example shown in FIG. 20, the Module 500 retrieves the binary operator properties of the "over", "in", and "out" operators from storage. These properties are stored in logic form. For example, the properties of the "over" operator are stored as ($\overline{L}$∩R)=TRUE and (L∩$\overline{R}$)=TRUE. Namely, the "over" operator has the capability of passing data up the tree for these regions. In another example, the properties of the "in" operator are stored as ($\overline{L}$∩R)=FALSE and (L∩$\overline{R}$)=FALSE. Namely, the "in" operator does not have the capability for passing data up the tree for these regions. In still another example, the properties of the "out" operator are stored as ($\overline{L}$∩R)=TRUE and (L∩$\overline{R}$)=FALSE. As will become apparent the inherent property of the binary operator in the region (L∩R) is not necessary for the performance of the Module 500 and is not stored in memory, as the binary operation of the node will always be performed when the right and left branches are active.

In the example of FIG. 20, the Activity Determination and Instruction Generation Module 500 after the initialisation phase then determines for a particular group of scanned pixel locations, that object C is active and Objects A, B, and D are inactive. The Module 500 determines the activity of the branches of each of the binary nodes from the activity of the objects. Namely, all the branches directly coupling the active leaf node objects (e.g. Object C and PAGE) to the root node (eg. 13) will be active. In this description, an active left branch is designated as L Active=TRUE, an inactive left branch is designated as L Active=FALSE, an active right branch is designated as R Active=TRUE, and an inactive right branch is designated as R Active=FALSE. In the example of FIG. 20, the Module 500 determines that:

(i) the left and right branches of binary node 13 are active (ie. L Active=TRUE and R Active=TRUE);
(ii) the left branch is inactive and the right branch is active of binary node 12 (ie L Active=FALSE and R Active=TRUE);
(iii) the left and right branches of binary node 11 are inactive (ie L Active=FALSE and R Active=FALSE); and (iv) the left branch is active and the right branch is inactive of binary node 8 (ie. L Active=TRUE and R Active=FALSE).

For the purposes of this description, the symbols &&, ||, and ! as used herein refer to the binary logic operators AND, OR and NOT respectively.

The Activity Determination and Instruction Generation Module 500 then traverses and generates instructions for the current group of scanned pixel locations depending upon of the activity of the binary operators, the activity of the branches of the expression tree, and the activity of the graphic objects (leaf nodes). The Module 500 traverses the expression tree commencing at the root node (eg. node 13) in a top down—left to right manner.

The Module 500 traverses only those branches of the expression tree that satisfy the following conditions:

(1) the left branch of any previously traversed binary node is traversed to its descendent node if (L active && R active)||((L∩R̄) && L active && !R active)==TRUE for the previously traversed binary node.

(2) the right branch of any previously traversed binary node is traversed to its descendent node if (L active && R active)||(L̄∩R) && !L active && R active)==TRUE for the previously traversed binary node.

The Activity Determination and Instruction Generation Module 500 generates during the same time as the traversal, operator instructions for any of the traversed binary nodes having active right and left branches, and leaf value instructions for any of the traversed leaf node.

In the example of FIG. 20, the Activity Determination and Instruction Generation Module 500 begins its traversal at root node 13. As both the left and right branches of the root node 13 are active, the Module 500 generates an "over" operator instruction. For the same reasons, the Module 500 will traverse to binary node 12 and binary node 0-5. As the Module 500 traverses in a top down left to right manner, it first traverses to binary node 12. At this binary node 12, the Module 500 does not generate an "over" operation, as the left branch of the binary 12 is inactive. For the same reasons, the Module 500 does not traverse the left branch to binary node 11. However, as the right branch of binary node 12 is active and the left branch of binary node 12 is inactive and as (L̄∩R)=TRUE for the "over" operator, the Module 500 traverses to binary node 8. At this binary node 8, the Module 500 does not generate an "out" operation, as the right branch of the binary 8 is inactive. For the same reasons, the Module 500 does not traverse the right branch to leaf node 6. However, as the left branch of binary node 8 is active and the right branch of binary node 8 is inactive and as (L∩R̄)=TRUE for the "out" operator, the Module 500 traverses to leaf node 7, where the Module 500 generates a leaf value instruction C. The Module 500 then returns to root node 13 to traverse to leaf node 0-5, where the Module 500 generates a leaf value instruction PAGE. Comparing FIGS. 19 and 20, it can thus be seen that the Module 500 generates a minimal instruction set corresponding to the expression tree for that current group of scanned pixel locations. The Module 500 will then repeat the operation for the next group of scanned pixel locations between the next adjacent edges.

The operation of the components of the Activity Determination and Instruction Generation Module 500 will now be described in more detail with reference to FIG. 5.

As mentioned above, the Level Activation Table Generator 502 generates a Level Activation Table. Turning now to FIG. 21, there is shown an example of such a generated Level Activation Table. This particular Level Activation Table represents a linearised form of the expression tree shown in FIG. 19. The Level Activation Table of FIG. 21 has a record for each node of the expression tree. These records each have the following fields "Index", "L Active", "R Active", "(L∩R̄)", "(L̄∩R)", "Leaf/Operator Entry", "Node Active", "Parent", "Node is L", "Generate L", "Generate R", "(L∩R) op used", and "R Branch Index". The contents of the fields "Index", "(L∩R̄)", "(L̄∩R)", "Leaf/Operator Entry", "Parent", "Node is L", and "R Branch Index" are static in that they do not vary as a function of the current scanned pixel location. On the other hand, the contents of the fields "L Active", "R Active", "Node Active", "Generate L", "Generate R", and "(L∩R) op used" may vary depending upon the currently scanned pixel location. The latter fields are updated by the Level Activation Table Update Module 504, for each group of pixel locations between the adjacent edges.

The "Index" field contains a numeric label of the node associated with the relevant record. For example, the record corresponding to the node 12 of FIG. 19 has an "Index" field set to 12. The "Parent" field contains the numeric label of the parent node of the node associated with the record. For example, the record corresponding to the node 12 of FIG. 19 has the "Parent" field set to 12. Namely, the parent node of node 12 is node 13. The "R branch Index" field contains a numeric label of the node descendent on the right branch of the node associated with the record. For example, the record corresponding to the node 12 of FIG. 19 has the "R branch Index" field set to 8. Namely, the node on the right branch of node 12 is node 8. The "Node is L" field is a logic field indicating whether or not the node associated with the record is descendant from its parent node's left branch. For example, the record corresponding to node 12 has the "Node is L" field set to TRUE (1). Namely, node 12 is descendant from parent node 13 via the parent node's 13 left branch. The "Leaf/Operator Entry" field contains the binary operator of the binary node or the object of the leaf node, which is associated with the relevant record. For example, the record corresponding to the binary node 12 of FIG. 19 has the "Leaf/Operator Entry" field set to the compositing operator "over". In another example, the record corresponding to the leaf node 7 of FIG. 19 has the "Leaf/Operator Entry" field set to object "C". In this way, the structure of the expression tree can be fully reconstructed.

The "L Active" field is a logic field indicating whether the left branch of the binary node corresponding to the record is active or not depending upon the current group of scanned pixels. Similarly, the "R Active" field is a logic field indicating whether the right branch of the binary node corresponding to the record is active or not depending upon the current group of scanned pixels. During the initialisation phase there are no currently scanned pixels, thus all "L Active" and "R Active" fields of the binary nodes can be set to FALSE (0), with the possible exception of the "R Active" field of the root node. For example, the "R Active" field of the record corresponding to the root node 13 of FIG. 19 is set to TRUE (1), as the right branch of the node 13 is always active irrespective of the scanned pixel. It should be noted that as leaf nodes have no branches, there is no need to set the "L Active" and "R Active" fields for the corresponding records.

The "(L∩R̄)" field is a logic field indicating whether or not data from this region (L∩R̄) is required to be passed up the expression tree. Similarly, the "(L̄∩R)" field is a logic field indicating whether or not data from this region (L̄∩R) is required to be passed up the expression tree. As mentioned above, this is an inherent property of the compositing operator. For example, the record corresponding to node 12 of FIG. 19 has the field "Leaf/Operator Entry" set to "over" and has the associated fields "(L∩R̄)" and "(L̄∩R)" both set to TRUE (1), as data from both these regions are required to be passed up the tree. In another example, the record corresponding to node 11 of FIG. 19 has "Leaf/Operator Entry" set to "in" and has the associated fields "(L∩R̄)" and "(L̄∩R)" both set to FALSE (0) as no data from these regions are required to be passed up the tree. It should be noted that as these fields relate to binary nodes only (ie compositing operations) there is no need to set these fields for records corresponding to leaf nodes.

The "Node Active" field is a logic field which is set to TRUE (1) when the following condition is satisfied otherwise it is set to FALSE (0):

(L∩R̄ && L active && !R active)
||
(L active && Ractive)
||
(L̄∩R && !L active && R active)
=TRUE For example, the fields "Node Active" for binary nodes 8, 11, and 12 shown in FIG. 19 are set to FALSE (0) during the initialisation phase as all the corresponding branches (L Active and R Active) are inactive (ie. FALSE). During the initialisation phase, the "Node Active" field for binary node 13 of FIG. 19 is set to TRUE (1) as its right branch is active (R Active=TRUE) and its left branch inactive (L Active=FALSE) and the region L̄∩R is required for the operation of the operator "over". It should be noted that as this field relates to binary nodes only (ie compositing operations) there is no need to set these fields for records corresponding to leaf nodes. The "Node Active" field of a record indicates whether or not the corresponding binary operator is active.

The "Generate L" field is a logic field which is set to TRUE (1) when the following condition is satisfied otherwise it is set to FALSE (0):

(L∩R̄ && L active && !R active)
||
(L active && Ractive)
=TRUE

For example, the fields "Generate L" for all the binary nodes 13, 12, 11, and 8 of FIG. 19 are set during the initialisation phase to FALSE (0) as this condition is not met by any of these nodes. Namely, the left branches of nodes 8, 11, 12, and 13 are all inactive ie L Active=FALSE (0). It should also be noted that as this field relates to binary nodes only (ie compositing operations) there is no need to set these fields for records corresponding to leaf nodes.

Similarly, the "Generate R" field is a logic field which is set to TRUE (1) when the following condition is satisfied otherwise it is set to FALSE (0):

(L active && Ractive)
||
(L̄∩R && !L active && R active)
=TRUE

For example, the fields "Generate R" for the binary nodes 12, 11, and 8 of FIG. 19 are set during the initialisation phase to FALSE (0) as this condition is not met by any of these nodes. For instance, the right branches of nodes 8, 11, and 12 are all inactive ie R Active=FALSE (0). However, the field "Generate R" for the binary node 13 is set during the initialisation to TRUE (1) as the right branch is active, the left branch inactive and (L̄∩R)=TRUE. It should also be noted that as this field relates to binary nodes only (ie compositing operations) there is no need to set these fields for records corresponding to leaf nodes.

The field "(L∩R) op used" is a logic field which is set to TRUE (1) when the following condition is satisfied otherwise it is set to FALSE (0):

(L active && Ractive)=TRUE

For example, as all the left branches of the binary nodes of FIG. 19 are inactive during the initialisation phase this field is set to FALSE (0) for all the binary nodes.

Figure 22:
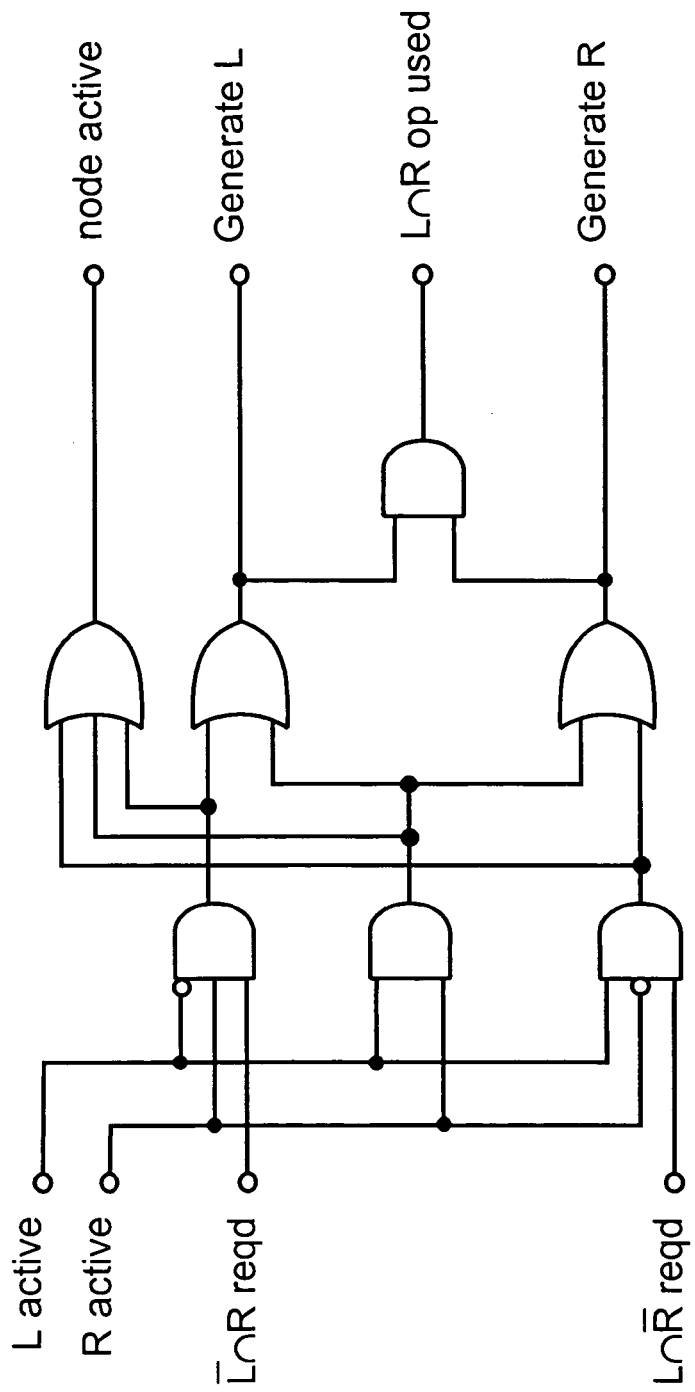
FIG. 22 shows the logic circuit used in the level activation table update module of FIG. 5.

Turning now to FIG. 22, there is shown a logic circuit for setting the aforementioned fields "Node Active", "Generate L", "Generate R", and "(L∩R) op used" of the Level Activation Table. This logic circuit contains a series of logic gates shown in conventional format, which is self-explanatory and need not be explained further.

Returning now to FIG. 5, the Level Activation Table Generator Module 502 stores the Level Activation Table generated during the initialisation phase in the memory 34. The Update Module 504 then retrieves this initialised Level Activation Table for each group of scanned pixel locations between adjacent edges and updates the fields of the Table. The Update Module 504 changes the state of the fields "L Active", "R Active", "Node Active", "Generate L", "Generate R", and "(L∩R) op used" depending upon the current group of scanned pixel locations. The Update Module 504 updates the records in a predetermined manner commencing at those records of the parent nodes of the leaf nodes corresponding to the active objects for that pixel location. Whenever the Update Module 504 changes the state of the "Node Active" field for a record, the Update Module 504 triggers a corresponding change in the state of the "L active" or "R active" field in the record of the parent node, depending on the state of the "Node is L" field. The Update Module 504 then updates the remaining fields of the record of the parent node in accordance with this newly changed "L Active" or "R Active field". This Updating process continues until a level is reached where the "Node Active" field remains unchanged. In the event there are more than one active objects, the Update Module updates the table one active object at a time.

The updating process of the Update Module 504 will now be explained with reference to FIG. 23, which shows an updated Level Activation Table for the expression tree of FIG. 20 where object C is active. The Update Module 504 first determines that the Object C is active for the current group of scanned pixel locations and then retrieves the initialised Level Activation Table from memory 34. The Update Module 504 determines the parent node of the active object C from the "Parent" field of the record of leaf node C. The update Module then proceeds to update the records of the table in the following manner commencing with the parent node of object C (record 8):

the "L Active" field in the parent node (record 8) is set;
  this asserts the "Generate L" field in record 8;
  the "Node Active" field is set in record 8;
  the "R active" field in the parent node (record 12) is set;
  this asserts the "Generate R" field in record 12;
  the "Node Active" field is set in record 12;
  the "L Active" field is set in the parent node (record 13);
  this asserts the "Generate L" and "L∩R op used" fields in record 13; and
  the "Node Active" field in record 13 is already set, so processing stops.

At this point, the table is in a correct state for generating instructions.

Returning now to FIG. 5, the Update Module 504 stores this updated Level Activation Table for the current group of scanned pixel locations in memory 34 which is then retrieved by the Traversal and Instruction Generator Module

506. The Traversal and Instruction generator Module 506 is a stack-machine based robot, which traverses the expression tree top-down, generating instructions in accordance with the updated Level Activation Table. The stack is used to store the "R branch Index" of a record. The stack-machine performs the following operations in accordance with the following pseudo-code:

```
IF Node is operation
THEN
    IF L∩R op used flag is set
    THEN
        add operation to instruction list
    ENDIF
    IF Generate R flag is set
        Push R branch index on the stack
    ENDIF
    IF Generate L flag is set
        Process next entry
    ENDIF
ELSE (Node is a leaf)
    Add leaf value instruction to instruction list
ENDIF
IF stack is empty
THEN
    STOP
ELSE
    Pop index off stack
    Process the entry
ENDIF
```

The traversal and instruction generating process of the Instruction Module 506 will now be explained with reference to FIG. 23, which shows an updated level activation table for the expression tree of FIG. 20 where object C is active. The generation of instructions in accordance with the above pseudo-code and the Level Activation Table of FIG. 23 proceeds as follows:

(i) processing starts at record 13 (root node);

(ii) the field "L∩R op used" of record 13 is TRUE (1) so the "over" instruction is added to the instruction list;

(iii) the field "Generate R" of record 13 is TRUE (1), so the contents of the "R Branch Index" of record 13 is added to the stack. The stack thus storing the index (5);

(iv) the field "Generate L" of record 13 is TRUE (1), so processing moves to record 12;

(v) the field "L∩R op used" of record 12 is FALSE (0), so no instruction is added;

(vi) the field "Generate R" of record 12 is TRUE (1), so the contents of the "R Branch Index" of record 12 is added to the stack. The stack currently thus storing the indices (8,5);

(vii) the field "Generate L" of record 12 is FALSE (0), thus the processing falls through;

(viii) the stack is not empty, so index 8 is popped off the stack, and processing moves to the record corresponding to index 8. The stack thus currently storing the index (5);

(ix) the field "L∩R op used" of record 8 is FALSE (0), so no instruction is added;

(x) the field "Generate R" of record 8 is FALSE (0), so nothing is added to the stack. The stack thus currently storing the index (5);

(xi) the field "Generate L" of record 8 is TRUE (1), so processing moves to the next entry, i.e record 7;

(xii) the record 7 is a leaf, so a leaf value instruction is added to the list, and processing falls through;

(xiii) stack is not empty, so index 5 is popped off the stack, and processing moves to index 5. The stack is now empty.

This process proceeds on to completion.

The instructions generated for this example are shown in FIG. 20.

In this way, the Traversal and Instruction Generator Module 506 is able to generate a minimal set of instructions necessary for the rendering of the expression tree for any one or more active objects. These instructions are then passed onto the fill colour determination module 600.

In another embodiment of the Activity Determination and Instruction Generation Module 500, the module takes into account the fact that, in the overlapping region, an opaque object may obscure the other object. Indeed, either branch of a node can be obscured by the other. If an object is obscured by an opaque object, then it does not need to be generated when both objects are active. The Level Activation Table can be modified to prevent these redundant operations from being performed.

Turning now to FIG. 25, there is shown an example of such a modified Level Activation Table. This Table is the same structure as the Level Activation Table of FIG. 21, except it has two extra fields "L obscures R" and "R obscures L". The field "L obscures R" is a logic field and indicates whether or not the left object obscures the right object when both the objects are active. Similarly, the field "R obscures L" is a logic field and indicates whether or not the right object obscures the left object when both the objects are active. The data contained in the fields "Node Active", "Generate R", "L∩R op used", and "Generate L" is also based on different logic than the Level Activation Table of FIG. 21. The obscurance flags are very useful in expression trees comprising both opaque and transparent objects.

Figure 24:
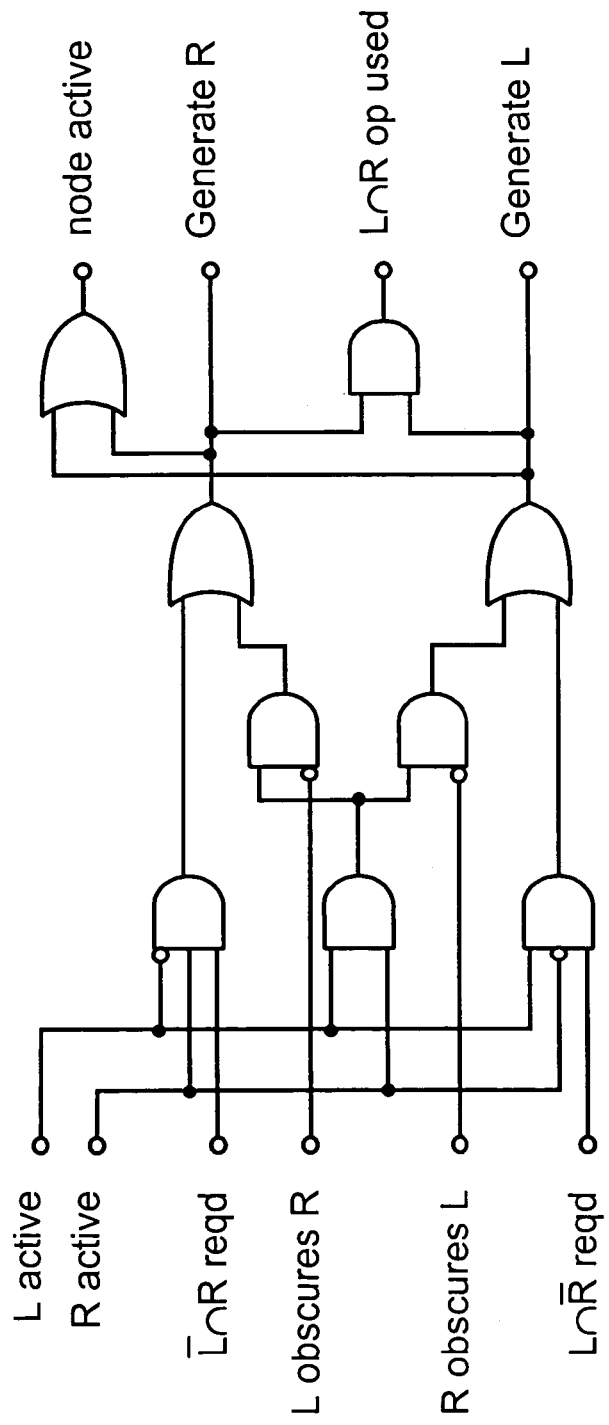
FIG. 24 shows a further embodiment of the logic circuit used in the level activation table update module of FIG. 5.

Turning now to FIG. 24, there is shown a logic circuit for setting the fields "Node Active", "Generate L", "Generate R", and "(L∩R) op used" of the modified Level Activation Table. It can seen that the "Node Active" logic has changed from FIG. 22, and is now based on whether data will be generated by the node. The critical path of the circuit is longer, but this allows clipping of objects to be performed using the same logic. If both of the obscurance fields are set, no data is generated in the intersection region (this is part of the implementation of a CLIP OUT).

These obscurance fields may be used to implement a CLIP IN operation and a CLIP OUT operation, as shown in the Level Activation Table of FIG. 25. The field settings for the CLIP IN and CLIP OUT operation are shown in the Table of FIG. 25.

The difference between a CLIP IN operation and a simple in operation is that the right branch operation is never performed. This can be seen from a comparison of the truth table of the IN operation as shown in FIG. 26 and from the truth table of the CLIP IN operation as shown in FIG. 27. In these truth tables, T stands for transparent (inactive), O stands for opaque, and L and R stand for L opacity unknown and R opacity unknown. The cases where a difference occurs are highlighted. In the CLIP IN case, activation of the right object enables the generation of instructions for the left object, such that the left object is edge clipped. Note that, the right object may be a composition of arbitrarily many objects, using whatever combinations and different fill rules as may be required. The activity state of right object is all that is used by the CLIP IN operation. In previous systems a clipping object consist of a separate single level which when activated or de-activated effected a counter for all levels to which the clip applies. In the present arrangement, the clip object appears as a special case of a general drawing object and appears as a node of the expression tree and consequently the activating or de-activating applies the clip without the need to increment or decrement counters on every level.

The difference between a CLIP OUT operation and a simple out operation can be seen from a comparison of the truth table of the OUT operation as shown in FIG. 28 and from the truth table of the CLIP IN operation as shown in FIG. 29. Again, T stands for transparent (inactive), O stands for opaque, and L and R stand for L opacity unknown and R opacity unknown. The cases where a difference occurs are again highlighted. In the CLIP OUT case, activation of the right object prevents the generation of instructions for the left object, such that the left object is edge clipped. As for a CLIP IN, the right object may be an arbitrarily complex collection of objects, with different fill rules as required. It is only the activity state that is used for clipping.

The Activity Determination and Instruction Generation Module 500 describe above is based on an expression tree. However, the principles of the Module 500 may be generalized to DAGs (Directed Acyclic Graphs). This can be achieved by a further embodiment of the Module 500 by allowing the parent node field of a record of the Level Activation Table to contain a list of table entries to its parent nodes, and providing an L index pointer. Changing the state of a node would then require that all of its parent nodes be modified, and instruction generation would be required to follow the L index, rather than simply looking for the next table entry. DAGs would be useful for use with clipping objects, where multiple objects are clipped by the same object.

A still further embodiment is based on the fact that the starting node, i.e. the first node which will provide an operation or data, will be a node which composites data from its left branch onto the rendered page. This may be identified by adding a 'Page' field to the level activation table which identifies nodes which composite their left branch with the rendered page (R is PAGE). This 'Page' field may be ANDed with the Generate L field to provide a single bit per table entry datum which identifies active nodes which are putting data onto the page. The starting node will be the highest priority node among these and can be searched for generating the instructions. This eliminates the overhead of tree traversal for the nodes on the spine which are not providing operations.

Figure 30:
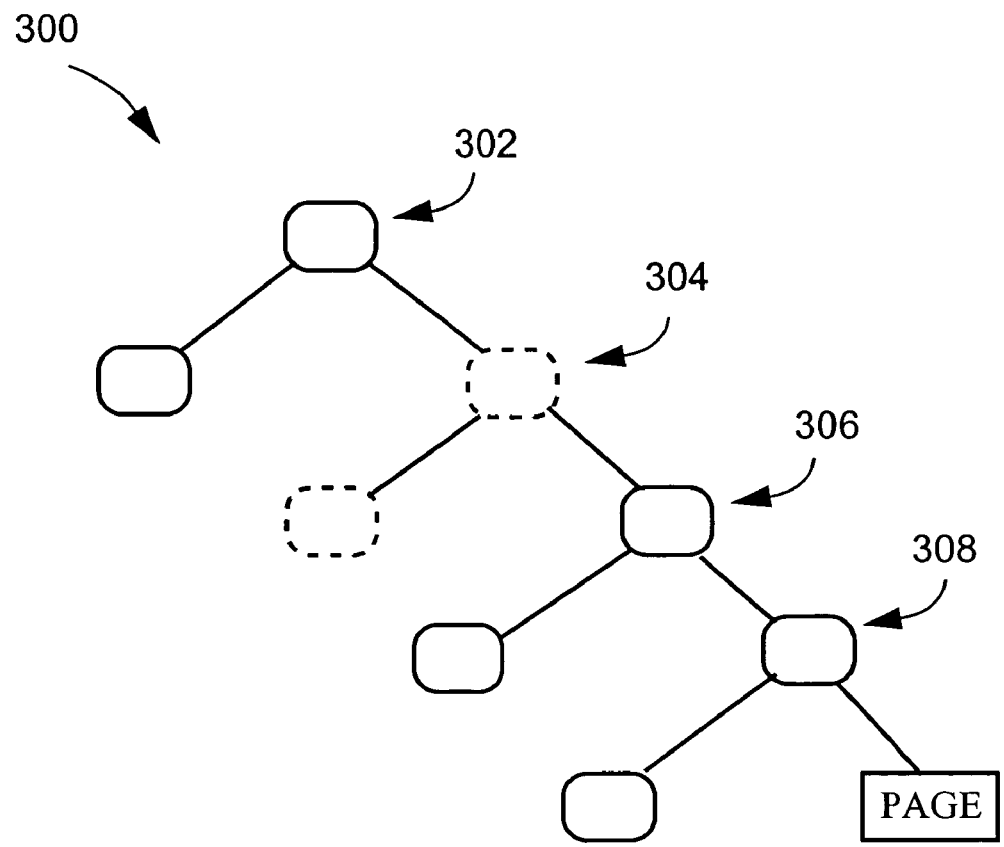
FIG. 30 illustrates an exemplary expression tree showing nodes which composite their left branch with the rendered page.

Turning now to FIG. 30, there is shown an exemplary expression tree 300 showing those nodes which composite their left branch with the rendered page. As can been seen, the nodes 302, 304, 306, and 308 composite their left branch onto the rendered branch and the 'Page' field for each of these nodes is set to TRUE (1). This 'page' field may be ANDed with the Generate L field for the same node, which identifies those active nodes putting data onto the page. In the example expression tree, nodes 302, 306 and 308 are active and node 304 inactive. Thus only those sub-trees of active nodes 302, 306 and 308 need be traversed in order to generate the required instructions, thus minimising tree traversal.

Although the preferred embodiment describes the Activity Determination and Instruction Generation Module 500 as an integrated circuit, it may be implemented as an equivalent software module executable on a general purpose processing unit, such as the host processor 2. The software module may form part of a computer program product which may be delivered to a user via a computer readable medium, such as a disk device or computer network.

4.0 Fill Colour Determination Module

Figure 6:
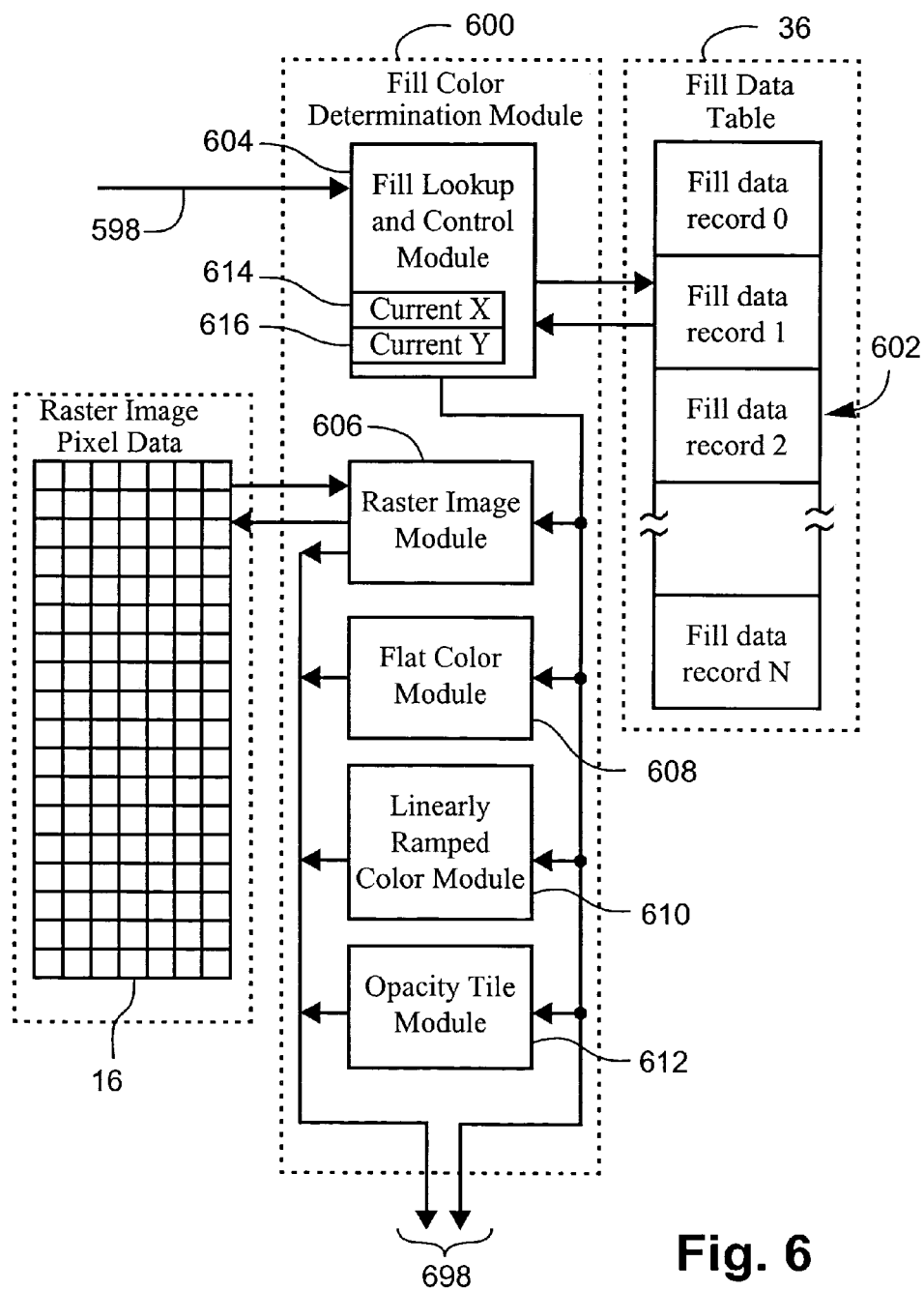
FIG. 6 is a schematic functional representation of the fill data determination module of FIG. 2.

The operation of the fill colour determination module 600 will now be described with reference to FIG. 6. Incoming messages 598 from the activity determination and instruction generation module 500, which include set fill data messages, repeat messages, fill priority messages, end of pixel messages, and end of scan line messages, first pass to a fill lookup and control module 604. The fill lookup and control module 604 maintains a current X position counter 614 and a current Y position counter 616 for use by various components of the fill colour determination module 600.

Upon receipt of an end of scan line message, the fill lookup and control module 604 resets the current X counter 614 to zero and increments the current Y counter 616. The end of scan line message is then passed to the pixel compositing module 700.

Upon receipt of a set fill data message, the fill lookup and control module 604 stores the data in the specified location 602 of the fill data table 36.

Upon receipt of a repeat message, the fill lookup and control module 604 increments the current X counter 614 by the count from the repeat message. The repeat message is then passed to the pixel compositing module 700.

Upon receipt of an end of pixel message, the fill lookup and control module 604 again increments the current X counter 614, and the end of pixel message is then passed to the pixel compositing module 700.

Upon receipt of a fill priority message, the fill lookup and control module 604 performs operations which include:

(i) the fill type from the fill priority message is used to select a record size in the table 36;

(ii) the fill table address from the fill priority message, and the record size as determined above, is used to select a record from the fill data table 36;

(iii) the fill type from the fill priority message is used to determine and select a sub-module to perform generation of the fill colour. The sub-modules may include a raster image module 606, a flat colour module 608, a linearly ramped colour module 610, and an opacity tile module 612;

(iv) the determined record is supplied to the selected sub-module 606-612;

(v) the selected sub-module 606-612 uses the supplied data to determine a colour and opacity value;

(vi) the determined colour and opacity is combined with remaining information from the fill colour message, namely the raster operation code, the alpha channel operation code, the source pop flag, and the destination pop flag, to form a colour composite message, which is sent to the pixel compositing module 700 via the connection 698.

In the preferred embodiment the determined colour and opacity is a red, green, blue and opacity quadruple with 8-bit precision in the usual manner giving 32 bits per pixel. However, a cyan, magenta, yellow and black quadruple with an implied opacity, or one of many other known colour representations may alternatively be used. The red, green, blue and opacity case is used in the description below, but the description may also be applied to other cases.

The operation of the raster image module 606, the flat colour module 608, the linearly ramped colour module 610, and the opacity tile module 612 will now be described.

The flat colour module 608 interprets the supplied record as a fixed format record containing three 8-bit colour components (typically interpreted as red, green and blue components) and an 8-bit opacity value (typically interpreted as a measure of the fraction of a pixel which is covered by the specified colour, where 0 means no coverage, that is complete transparency, and 255 means complete coverage, that is, completely opaque). This colour and opacity value is output directly via the connection 698 and forms the determined colour and opacity without further processing.

The linearly ramped colour module 610 interprets the supplied record as a fixed format record containing four sets of constants cx, cy and d, associated with the three colour and one opacity components, and two position values xbase and ybase being the coordinates of the reference point of the linear ramp. At the reference point, the colour and opacity components have their associated d value.

For each of the four sets, a result value r is computed by combining three constants with the current X and Y coordinates, and the xbase and ybase constants, using the formula:

$$r = \text{clamp}(cx \times (X-x\text{base}) + cy \times (Y-y\text{base}) + d)$$

where the function clamp is defined as:

$$\text{clamp}(x) = \begin{cases} 255 & 255 < x \\ \lfloor x \rfloor & 0 < x < 255 \\ 0 & x < 0 \end{cases}$$

In an alternative implementation, the linearly ramped colour module 610 interprets the supplied record as a fixed format record containing four sets of three constants, cx, cy, and d, being associated with the three colour and one opacity components. For each of these four sets, a result value r is computed by combining the three constants with the current X count, x, and the current Y count, y, using the formula:

$$r = \text{clamp}(cx \times x + cy \times y + d)$$

where the function clamp is defined as above.

The four results so produced are formed into a colour and opacity value. This colour and opacity value is output directly via the connection 698 and forms the determined colour and opacity without further processing.

Other mathematical calculations giving the same result may be used.

The opacity tile module 612 interprets the supplied record as a fixed format record containing three 8-bit colour components, an 8-bit opacity value, an integer X phase, (px), a Y phase, (py), an X scale, (sx), a Y scale, (sy), and a 64 bit mask. These values originate in the display list generation and contained typically in the original page description. A bit address, a, in the bit mask, is determined by the formula:

$$a = ((x/2^{sx} + px) \bmod 8) + ((y/2^{sy} + py) \bmod 8) \times 8$$

The bit at the address "a" in the bit mask is examined. If the examined bit is one, the colour and opacity from the record is copied directly to the output of the module 612 and forms the determined colour and opacity. If the examined bit is zero, a colour having three zero component values and a zero opacity value is formed and output as the determined colour and opacity.

The raster image module 606 interprets the supplied record as a fixed format record containing six constants, a, b, c, d, xbase and ybase; an integer count of the number of bits (bpl) in each raster line of the raster image pixel data 16 to be sampled; and a pixel type. The pixel type indicates whether the pixel data 16 in the raster image pixel data is to be interpreted as one of:

(i) one bit per pixel black and white opaque pixels;
(ii) one bit per pixel opaque black or transparent pixels;
(iii) 8 bits per pixel grey scale opaque pixels;
(iv) 8 bits per pixel black opacity scale pixels;
(v) 24 bits per pixel opaque three colour component pixels; or
(vi) 32 bits per pixel three colour component plus opacity pixels.

Many other formats are possible.

The raster image module 606 uses the pixel type indicator to determine a pixel size (bpp) in bits. Then a bit address, a, in the raster image pixel data 16 is calculated having the formula:

$$a = bpp * \lfloor a \times (x - x\text{base}) + c \times (y - y\text{base}) \rfloor + bpl \times \lfloor b \times (x - x\text{base}) + d \times (y - y\text{base}) \rfloor.$$

A pixel interpreted according to the pixel type from the record 602 is fetched from the calculated address "a" in the raster image pixel data 16. The pixel is expanded as necessary to have three eight bit colour components and an eight bit opacity component. By "expanded", it is meant for example, that a pixel from an eight bit per pixel grey scale opaque raster image would have the sampled eight bit value applied to each of the red, green and blue component, and the opacity component set to fully opaque. This then forms the determined colour and opacity output 698 to the pixel compositing module 700.

As a consequence, the raster pixel data valid within a displayable object is obtained through the determination of a mapping to the pixel image data within the memory 16. This effectively implements an affine transform of the raster pixel data into the object-based image and is more efficient than prior art methods which transfer pixel data from an image source to a frame store where compositing with graphic object may occur.

As a preferred feature to the above, interpolation between pixels in the raster image pixel data 16 may optionally be performed by first calculating intermediate results p, and q according to the formulae:

$$p = a \times (x - x\text{base}) + c \times (y - y\text{base})$$

$$q = b \times (x - x\text{base}) + d \times (y - y\text{base}).$$

Next the bit addresses, $a_{00}$, $a_{01}$, $a_{10}$, and $a_{11}$, of four pixels in the raster image pixel data 16 are determined according to the formulae:

$$a_{00} = bpp \times \lfloor p \rfloor + bpl \times \lfloor q \rfloor$$

$$a_{01} = a_{00} + bpp$$

$$a_{10} = a_{00} + bpl$$

$$a_{11} = a_{00} + bpl + bpp$$

Next, a result pixel component value, r, is determined for each colour and opacity component according to the formula:

$$r = \text{interp}(\text{interp}(\text{get}(a_{00}), \text{get}(a_{01}), p), \text{interp}(\text{get}(a_{10}), \text{get}(a_{11}), p), q)$$

where the function interp is defined as:

$$\text{interp}(a, b, c) = a + (b - a) \times (c - \lfloor c \rfloor)$$

In the above equations, the representation $\lfloor \text{value} \rfloor = \text{floor}(\text{value})$, where a floor operation involves discarding the fractional part of value.

The get function returns the value of the current pixel component sampled from the raster image pixel data 16 at the given bit address. Note that for some components of some image types this can an implied value.

As a preferred feature to the above, image tiling may optionally be performed by using x and y values in the above equations which are derived from the current X and Y counters 614, 616 by a modulus operation with a tile size read from the supplied record.

Many more such fill colour generation sub-modules are possible.

5.0 Pixel Compositing Module

The operation of the pixel compositing module 700 will now be described. Incoming messages from the fill colour determination module 600, which include repeat messages, colour composite messages, end of pixel messages, and end of scan line messages are processed in sequence.

Upon receipt of a repeat message or an end of scan line message, the pixel compositing module 700 forwards the message to a pixel output FIFO 702 without further processing.

Upon receipt of a colour composite message the pixel compositing module 700 typically, and in general terms combines the colour and opacity from the colour composite message with a colour and opacity popped from the pixel compositing stack 38 according to the raster operation and alpha channel operation from the colour composite message. It then pushes the result back onto the pixel compositing stack 38. A description of the processing performed upon of receipt of a colour composite message is given below.

Upon receipt of an end of pixel message, the pixel compositing module 700 pops a colour and opacity from the pixel compositing stack 38, with the exception that if the stack 38 is empty an opaque white value is used. The resultant colour and opacity is formed into an pixel output message which is forwarded to the pixel output FIFO.

A known compositing approach is that described in "Compositing Digital Images", Porter, T; Duff, T; Computer Graphics, Vol. 18 No. 3 (1984) pp. 253-259. Examples of Porter and Duff compositing operations are shown in FIG. 15. However, such an approach is deficient in that it only permits handling source and destination colour in the intersecting region formed by the composite and, as a consequence, is unable to accommodate the influence of transparency in the intersecting region. This results in the raster operations defined by Porter and Duff as being essentially inoperative in the presence of transparency.

The processing performed by the pixel compositing module 700 upon receipt of a colour composite message will now be described.

Upon receipt of a colour composite message, the pixel compositing module 700 first forms a source colour and opacity. This is taken from the colour and opacity provided in the colour composite message unless the pop source flag is set in the colour composite message, in which case the colour is popped from the pixel compositing stack 38 instead. If at this time, or during any pop of the pixel compositing stack, the pixel compositing stack 38 is found to be empty, an opaque white colour value is used without any error indication. Next, a destination colour and opacity is popped from the pixel compositing stack 38, except that if the destination pop flag is not set in the colour composite message, the stack pointer is not disturbed during the "pop" operation, in effect making this a read from top of stack 38 instead.

Figure 7A:
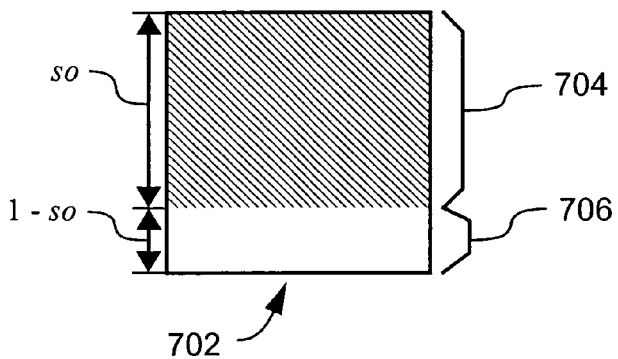
FIGS. 7A to 7C illustrate pixel combinations between source and destination.
Figure 7B:
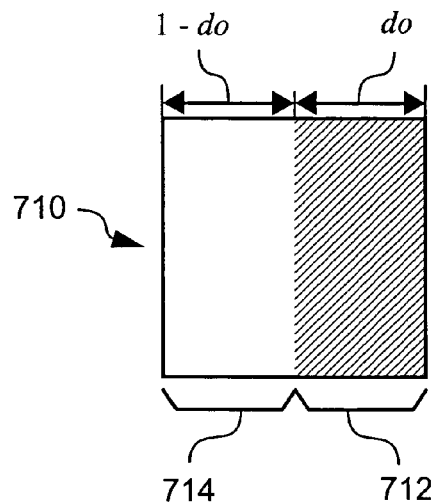
Figure 7C:
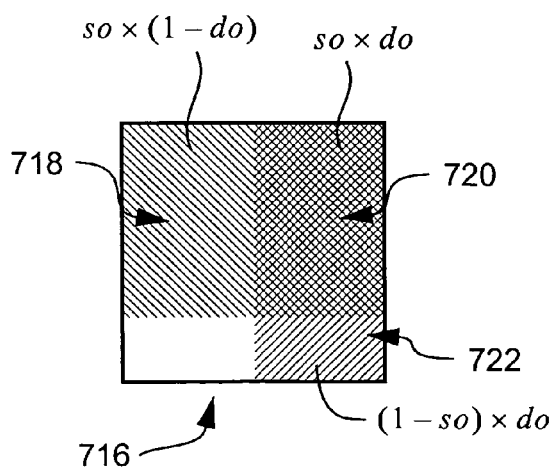

The method of combining the source colour and opacity with the destination colour and opacity will now be described with reference to FIGS. 7A to 7C. For the purposes of this description, colour and opacity values are considered to range from 0 to 1, (ie: normalised) although they are typically stored as 8-bit values in the range 0 to 255. For the purposes of compositing together two pixels, each pixel is regarded as being divided into two regions, one region being fully opaque and the other fully transparent, with the opacity value being an indication of the proportion of these two regions. FIG. 7A shows a source pixel 702 which has some three component colour value not shown in the figure and an opacity value, (so). The shaded region of the source pixel 702 represents the fully opaque portion 704 of the pixel 702. Similarly, the non-shaded region in FIG. 7A represents that proportion 706 of the source pixel 702 considered to be fully transparent. FIG. 7B shows a destination pixel 710 with some opacity value, (do). The shaded region of the destination pixel 710 represents the fully opaque portion 712 of the pixel 710. Similarly, the pixel 710 has a fully transparent portion 714. The opaque regions of the source pixel 702 and destination pixel 710 are, for the purposes of the combination, considered to be orthogonal to each other. The overlay 716 of these two pixels is shown in FIG. 7C. Three regions of interest exist, which include a source outside destination 718 which has an area of so×(1−do), a source intersect destination 720 which has an area of so×do, and a destination outside source 722 which has an area of (1−so)×do. The colour value of each of these three regions is calculated conceptually independently. The source outside destination region 718 takes its colour directly from the source colour. The destination outside source region 722 takes its colour directly from the destination colour. The source intersect destination region 720 takes its colour from a combination of the source and destination colour. The process of combining source and destination colour, as distinct from the other operations discussed above is termed a raster operation and is one of a set of functions as specified by the raster operation code from the pixel composite message. Some of the raster operations included in the preferred embodiment are shown in the Table shown in FIG. 17 of the drawings.

Each function is applied to each pair of corresponding colour components of the source and destination colour to obtain a like component in the resultant colour. Many other functions are possible.

The alpha channel operation from the composite pixel message is also considered. The alpha channel operation is performed using three flags, each of which corresponds to one of the regions of interest in the overlay 716 of the source pixel 702 and the destination pixel 710. For each of the regions, a region opacity value is formed which is zero if the corresponding flag in the alpha channel operation is not set, else it is the area of the region.

The resultant opacity is formed from the sum of the region opacities. Each component of the result colour is then formed by the sum of the products of each pair of region colour and region opacity, divided by the resultant opacity.

The resultant colour and opacity is pushed onto the pixel compositing stack 38.

6.0 Pixel Output Module

The operation of the pixel output module 800 will now be described. Incoming messages are read from the pixel output FIFO, which include pixel output messages, repeat messages, and end of scan line messages are processed in sequence.

Upon receipt of a pixel output message the pixel output module 800 stores the pixel and also forwards the pixel to its output. Upon receipt of a repeat message the last stored pixel is forwarded to the output 898 as many times as specified by the count from the repeat message. Upon receipt of an end of scan line message the pixel output module 800 passes the message to its output.

The output 898 may connect as required to any device that utilizes pixel image data. Such devices include output devices such as video display units or printers, or memory storage devices such as hard disk, semiconductor RAM including line, band or frame stores, or a computer network.

It will be appreciated by those skilled in the art that compositing of objects over larger numbers of levels is also possible by extrapolating the method described herein. Furthermore, it will also be appreciated that the various manipulations shown can be used in different compositing paradigms, including framestore-based systems and other stack-based, line or band-based compositing systems.

It will be apparent from the foregoing that the method and apparatus described provide for the rendering of graphic objects with full functionality demanded by sophisticated graphic description languages without a need for intermediate storage of pixel image data during the rendering process.

INDUSTRIAL APPLICABILITY

It is apparent from the above that the embodiment(s) of the invention are applicable to the computer graphics and printing industries.

The foregoing describes only one embodiment/some embodiments of the present invention, and modifications and/or changes can be made thereto without departing from the scope and spirit of the invention, the embodiment(s) being illustrative and not restrictive.

The invention claimed is:

1. A method of rendering an expression tree into a raster pixel image having a plurality of pixel locations, the expression tree having a plurality of nodes comprising one or more binary nodes and a plurality of leaf nodes, wherein each binary node has a left branch to a descendent node and a right branch to another descendent node and represents a binary operation on the two descendent nodes, and wherein each node represents a graphic object having object edges, with one or more of the graphic objects overlapping, the overlapping graphic objects comprising a left node region, a common region, and a right node region, said method comprising the steps of:
   determining groups of one or more pixel locations, wherein the groups are bounded by the object edges;
   determining, for each group, whether the left and right branches of the one or more binary nodes are active or inactive; and
   traversing, for each group, the expression tree, wherein said traversing step comprises the substeps of:
   checking whether the right and left branches of a previously traversed binary node are active or a left node region is required for the binary operation of the previously traversed binary node and the left branch is active and the right branch is inactive of the previously traversed binary node, and if so, traversing the left branch of the previously traversed binary node to the descendent node; and
   checking whether the right and left branches of the previously traversed binary node are active or a right node region is required for the binary operation of the previously traversed binary node and the right branch is active and the left branch is inactive of the previously traversed binary node, and if so, traversing the right branch of the previously traversed binary node to the descendent node;
   generating, for each group, operator instructions for any binary node traversed in said traversing step and having active right and left branches;
   generating, for each group, leaf value instructions for any leaf node traversed in said traversing step;
   executing for each group, the generated instructions to render the graphic objects at the one or more pixel locations; and
   reproducing the rendered graphic objects on a reproduction device.

2. A method according to claim 1, wherein said traversing step traverses the expression tree, wherein the left branch of any previously traversed binary node is traversed to its descendent node if the right and left branches of the previously traversed binary node are active and if the graphic object representing the descendent node on the right branch of the previously traversed binary node does not obscure the graphic object representing the descendent node on the left branch of the previously traversed binary node in the common region of the graphic objects representing the descendent nodes of the previously traversed binary node, and wherein the right branch of any previously traversed binary node is traversed to its descendent node if the right and left branches of the previously traversed binary node are active and if the graphic object representing the descendent node on the left branch of the previously traversed binary node does not obscure the graphic object representing the descendent node on the right branch of the previously traversed binary node in the common region of the graphic objects representing the descendent nodes of the previously traversed binary node.

3. A method of rendering an expression tree into a raster pixel image having a plurality of scanlines and a plurality of pixel locations on each scanline, the expression tree having a plurality of nodes comprising one or more binary nodes and a plurality of leaf nodes, wherein each binary node has a left branch to a descendent node and a right branch to another descendent node and represents a binary operation on the two descendent nodes, and wherein each node represents a graphic object having object edges, with one or more graphic objects overlapping, the overlapping graphic objects comprising a left node region, a common region, and a right node region, said method comprising the steps of:
   generating a table representative of the expression tree, wherein the table comprises a plurality of records corresponding to associated binary nodes and leaf nodes, and each record of an associated binary node comprises a first field indicating whether a left node region is required for operation of the operator of the associated binary node, a second field indicating whether a right node region is required for operation of the operator of the associated binary node, a third field capable of indicating whether a left branch of the associated binary node is active, and a fourth field capable of indicating whether a right branch of the associated binary node is active;
   determining groups of one or more pixel locations, wherein the groups are bounded by object edges;
   determining, for each group, whether the left and right branches of the one or more binary nodes are active or inactive;
   updating, for each group, the third and fourth fields of the table for the determined active and inactive branches;

traversing, for each group, the expression tree in accordance with the updated table wherein said traversing step comprises the substeps of:

checking whether the right and left branches of a previously traversed binary node are active or a left node region is required for the binary operation of said previously traversed binary node and the left branch is active and the right branch is inactive of the previously traversed binary node and, if so, traversing the left branch of the previously traversed binary node to the descendent node; and checking whether the right and left branches of the previously traversed binary node are active or a right node region is required for the binary operation of the previously traversed binary node and the right branch is active and the left branch is inactive of the previously traversed binary node and, if so, traversing the right branch of the previously traversed binary node to the descendent node;

generating, for each group, operator instructions for any traversed binary node having active said right and left branches, and leaf value instructions for any traversed leaf node;

executing, for each group, corresponding generated instructions so as to render the image; and reproducing the rendered image on a reproduction device.

4. A method according to claim 3, wherein the table further comprises for each record of an associated binary node a fifth field indicating whether the graphic object representing the descendent node on the right branch of the associated binary node obscures the graphic object representing the descendent node on the left branch of the associated binary node in the common region of the graphic objects representing the descendent nodes of the associated binary node, and a sixth field indicating whether the graphic object representing the descendent node on the left branch of the associated binary node obscures the graphic object representing the descendent node on the right branch of the associated binary node in the common region of the graphic objects representing the descendent nodes of the associated binary node, and wherein said traversing step traverses the expression tree in accordance with the updated table, wherein the left branch of any previously traversed binary node is traversed to its descendent node if the right and left branches of the previously traversed binary node are active and if the graphic object representing the descendent node on the right branch of the previously traversed binary node does not obscure the graphic object representing the descendent node on the left branch of the previously traversed binary node in the common region of the graphic objects representing the descendent nodes of the previously traversed binary node, and wherein the right branch of any previously traversed binary node is traversed to its descendent node if the right and left branches of the previously traversed binary node are active and if the graphic object representing the descendent node on the left branch of the previously traversed binary node does not obscure the graphic object representing the descendent node on the right branch of the previously traversed binary node in the common region of the graphic objects representing the descendent nodes of the previously traversed binary node.

5. A method according to claim 4, wherein the fifth and sixth fields are used to implement a CLIP IN or a CLIP OUT operation.

6. An apparatus for rendering an expression tree into a raster pixel image having a plurality of pixel locations, the expression tree having a plurality of nodes comprising one or more binary nodes and a plurality of leaf nodes, wherein each binary node has a left branch to a descendent node and a right branch to another descendent node and represents a binary operation on the two descendent nodes, and wherein each node represents a graphic object having object edges, with one or more graphic objects overlapping, the overlapping graphic objects comprising a left node region, a common region, and a right node region, said apparatus comprising:

means for determining groups of one or more pixel locations, wherein the groups are bounded by the object edges;

means for determining, for each group, whether the left and right branches of one or more binary nodes are active or inactive;

means for traversing, for each group, the expression tree, wherein said means for traversing comprises:

means for checking whether the right and left branches of a previously traversed binary node are active or a left node region is required for the binary operation of the previously traversed binary node and the left branch is active and the right branch is inactive of the previously traversed binary node and, if so, traversing the left branch of the previously traversed binary node to the descendent node; and means for checking whether the right and left branches of the previously traversed binary node are active or a right node region is required for the binary operation of the previously traversed binary node and the right branch is active and the left branch is inactive of the previously traversed binary node and, if so, traversing the right branch of the previously traversed binary node to the descendent node;

means for generating, for each group, operator instructions for any binary node traversed by said traversing means and having active right and left branches, means for generating, for each group, leaf value instructions for any leaf node traversed by said traversing means; and means for executing, for each group, the generated instructions to render the graphic objects at the one or more pixel locations.

7. An apparatus according to claim 6, wherein said traversing means traverses the expression tree, wherein the left branch of any previously traversed said binary node is traversed to its descendent node if the right and left branches of the previously traversed binary node are active and if the graphic object representing the descendent node on the right branch of the previously traversed binary node does not obscure the graphic object representing the descendent node on the left branch of the previously traversed binary node in the common region of the graphic objects representing the descendent nodes of the previously traversed binary node, and wherein the right branch of any previously traversed binary node is traversed to its descendent node if the right and left branches of the previously traversed binary node are active and if the graphic object representing the descendent node on the left branch of the previously traversed binary node does not obscure the graphic object representing the descendent node on the right branch of the previously traversed binary node in the common region of the graphic objects representing the descendent nodes of the previously traversed binary node.

8. An apparatus for rendering an expression tree into a raster pixel image having a plurality of scanlines and a plurality of pixel locations on each scanline, the expression tree having a plurality of nodes comprising one or more binary nodes and a plurality of leaf nodes, wherein each binary node has a left branch to a descendent node and a right branch to another descendent node and represents a binary operation on the two descendent nodes, and wherein each node represents a graphic object having object edges, with one or more graphic objects overlapping, the overlapping graphic objects comprising a left node region, a common region, and a right node region, said apparatus comprising:

means for generating a table representative of the expression tree, wherein the table comprises a plurality of records corresponding to associated binary nodes and leaf nodes, and each record of an associated binary node comprises a first field indicating whether a left node region is required for operation of the operator of the associated binary node, a second field indicating whether a right node region is required for operation of the operator of the associated binary node, a third field capable of indicating whether a left branch of the associated binary node is active, and a fourth field capable of indicating whether a right branch of the associated binary node is active;

means for determining groups of one or more pixel locations, wherein the groups are bounded by the object edges;

means for determining, for each group, whether the left and right branches of the one or more binary nodes are active or inactive;

means for updating, for each group, the third and fourth fields of the table for the determined active and inactive branches;

means for traversing, for each group, the expression tree in accordance with the updated table wherein said means for traversing comprises:

means for checking whether the right and left branches of a previously traversed binary node are active or a left node region is required for the binary operation of the previously traversed binary node and the left branch is active and the right branch is inactive of the previously traversed binary node and, if so, traversing the left branch of the previously traversed binary node to the descendent node; and means for checking whether the right and left branches of the previously traversed binary node are active or a right node region is required for the binary operation of the previously traversed binary node and the right branch is active and the left branch is inactive of the previously traversed binary node and, if so, traversing the right branch of the previously traversed node to the descendent node;

means for generating, for each group, operator instructions for any traversed binary node having active right and left branches, and leaf value instructions for any traversed leaf node; and means for executing, for each group, corresponding generated instructions so as to render the image.

9. An apparatus according to claim 8, wherein the table further comprises for each record of an associated binary node a fifth field indicating whether the graphic object representing the descendent node on the right branch of the associated binary node obscures the graphic object representing the descendent node on the left branch of the associated binary node in the common region of the graphic objects representing the descendent nodes of the associated binary node, and a sixth field indicating whether the graphic object representing the descendent node on the left branch of the associated binary node obscures the graphic object representing the descendent node on the right branch of the associated binary node in the common region of the graphic objects representing the descendent nodes of the associated binary node, and wherein said traversing means traverses the expression tree in accordance with the updated table, wherein the left branch of any previously traversed binary node is traversed to its descendent node if the right and left branches of the previously traversed binary node are active and if the graphic object representing the descendent node on the right branch of the previously traversed binary node does not obscure the graphic object representing the descendent node on the left branch of the previously traversed binary node in the common region of the graphic objects representing the descendent nodes of the previously traversed binary node, and wherein the right branch of any previously traversed binary node is traversed to its descendent node if the right and left branches of the previously traversed binary node are active and if the graphic object representing the descendent node on the left branch of the previously traversed binary node does not obscure the graphic object representing the descendent node on the right branch of the previously traversed binary node in the common region of the graphic objects representing the descendent nodes of the previously traversed binary node.

10. An apparatus according to claim 9, wherein the fifth and sixth fields are used to implement a CLIP IN or a CLIP OUT operation.

11. A computer readable medium comprising a computer program for rendering an expression tree into a raster pixel image having a plurality of pixel locations, the expression tree having a plurality of nodes comprising one or more binary nodes and a plurality of leaf nodes, wherein each binary node has a left branch to a descendent node and a right branch to another descendent node and represents a binary operation on the two descendent nodes, and wherein each node represents a graphic object having object edges, with one or more graphic objects overlapping, the overlapping graphic objects comprising a left node region, a common region, and a right node region, said computer program comprising:

code for determining groups of one or more pixel locations, wherein the groups are bounded by the object edges;

code for determining, for each group, whether the left and right branches of the one or more binary nodes are active or inactive;

code for traversing, for each group, the expression tree, wherein said code for traversing comprises:

code for checking whether the right and left branches of a previously traversed binary node are active or a left node region is required for the binary operation of the previously traversed binary node and the left branch is active and the right branch is inactive of the previously traversed binary node and, if so, traversing the left branch of the previously traversed binary node to the descendent node; and code for checking whether the right and left branches of the previously traversed binary node are active or a right node region is required for the binary operation of the previously traversed binary node and the right branch is active and the left branch is inactive of the previously traversed binary node and, if so, traversing the right branch of the previously traversed binary node to the descendent node;

code for generating, for each group, operator instructions for any binary node traversed by said code for traversing and having active right and left branches, code for generating, for each group, leaf value instructions for any leaf node traversed by said code for traversing;

code for executing, for each group, the generated instructions to render the graphic objects at the one or more pixel locations; and code for reproducing the rendered graphic objects on a reproduction device.

12. A computer readable medium according to claim 11, wherein said traversing code traverses the expression tree, wherein the left branch of any previously traversed binary node is traversed to its descendent node if the right and left branches of the previously traversed binary node are active and if the graphic object representing the descendent node on the right branch of the previously traversed binary node does not obscure the graphic object representing the descendent node on the left branch of the previously traversed binary node in the common region of the graphic objects representing the descendent nodes of the previously traversed binary node, and wherein the right branch of any previously traversed binary node is traversed to its descendent node if the right and left branches of the previously traversed binary node are active and if the graphic object representing the descendent node on the left branch of the previously traversed binary node does not obscure the graphic object representing the descendent node on the right branch of the previously traversed binary node in the common region of the graphic objects representing the descendent nodes of the previously traversed binary node.

13. A computer readable medium comprising a computer program for rendering an expression tree into a raster pixel image having a plurality of scanlines and a plurality of pixel locations on each scanline, the expression tree having a plurality of nodes comprising one or more binary nodes and a plurality of leaf nodes, wherein each binary node has a left branch to a descendent node and a right branch to another descendent node and represents a binary operation on the two descendent nodes, and wherein each node represents a graphic object having object edges, with one or more graphic objects overlapping, the overlapping graphic objects comprising a left node region, a common region, and a right node region, said computer program comprising:

code for generating a table representative of the expression tree, wherein the table comprises a plurality of records corresponding to associated binary nodes and leaf nodes, and each record of an associated binary node comprises a first field indicating whether a left node region is required for operation of the operator of the associated binary node, a second field indicating whether a right node region is required for operation of the operator of the associated binary node, a third field capable of indicating whether a left branch of the associated binary node is active, and a fourth field capable of indicating whether a right branch of the associated binary node is active;

code for determining groups of one or more pixel locations, wherein the groups are bounded by the object edges;

code for determining, for each group, whether the left and right branches of the one or more binary nodes are active or inactive;

code for updating, for each group, the third and fourth fields of the table for the determined active and inactive branches;

code for traversing, for each group, the expression tree in accordance with the updated table wherein said code for traversing comprises:

code for checking whether the right and left branches of a previously traversed binary node are active or a left node region is required for the binary operation of the previously traversed binary node and the left branch is active and the right branch is inactive of the previously traversed binary node and, if so, traversing the left branch of the previously traversed binary node to the descendent node; and code for checking whether the right and left branches of the previously traversed binary node are active or a right node region is required for the binary operation of the previously traversed binary node and the right branch is active and the left branch is inactive of the previously traversed binary node and, if so, traversing the right branch of the previously traversed binary node to the descendent node;

code for generating, for each group, operator instructions for any traversed binary node having active right and left branches, and leaf value instructions for any traversed leaf node;

code for executing, for each group, corresponding generated instructions so as to render the image; and code for reproducing the rendered image on a reproduction device.

14. A computer readable medium according to claim 13, wherein the table further comprises for each record of an associated binary node a fifth field indicating whether the graphic object representing the descendent node on the right branch of the associated binary node obscures the graphic object representing the descendent node on the left branch of the associated binary node in the common region of the graphic objects representing the descendent nodes of the associated binary node, and a sixth field indicating whether the graphic object representing the descendent node on the left branch of the associated binary node obscures the graphic object representing the descendent node on the right branch of the associated binary node in the common region of the graphic objects representing the descendent nodes of the associated binary node, and wherein said traversing means traverses the expression tree in accordance with the updated table, wherein the left branch of any previously traversed binary node is traversed to its descendent node if the right and left branches of the previously traversed binary node are active and if the graphic object representing the descendent node on the right branch of the previously traversed binary node does not obscure the graphic object representing the descendent node on the left branch of the previously traversed binary node in the common region of the graphic objects representing the descendent nodes of the previously traversed binary node, and wherein the right branch of any previously traversed binary node is traversed to its descendent node if the right and left branches of the previously traversed binary node are active and if the graphic object representing the descendent node on the left branch of the previously traversed binary node does not obscure the graphic object representing the descendent node on the right branch of the previously traversed binary node in the common region of the graphic objects representing the descendent nodes of the previously traversed binary node.

15. A computer program according to claim 14, wherein the fifth and sixth fields are used to implement a CLIP IN or a CLIP OUT operation.

* * * * *

UNITED STATES PATENT AND TRADEMARK OFFICE
CERTIFICATE OF CORRECTION

PATENT NO. : 7,277,102 B2  
APPLICATION NO. : 09/836226  
DATED : October 2, 2007  
INVENTOR(S) : Kevin John Moore It is certified that error appears in the above-identified patent and that said Letters Patent is hereby corrected as shown below:

COLUMN 4:

Line 37, "active" should read --active at--.

COLUMN 25:

Line 17, "Ractive" should read --R active)--.  
Line 40, "Ractive" should read --R active)--.  
Line 53, "Ractive" should read --R active)--.

Signed and Sealed this

Third Day of February, 2009

JOHN DOLL  
*Acting Director of the United States Patent and Trademark Office*